United States Patent
Weatherhead et al.

(10) Patent No.: US 8,392,008 B2
(45) Date of Patent: Mar. 5, 2013

(54) MODULE ARBITRATION AND OWNERSHIP ENHANCEMENTS

(75) Inventors: N. Andrew Weatherhead, Ayr (CA); Mark K. Carmount, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1569 days.

(21) Appl. No.: 11/856,118

(22) Filed: Sep. 17, 2007

(65) Prior Publication Data
US 2008/0098401 A1 Apr. 24, 2008

Related U.S. Application Data

(60) Provisional application No. 60/862,403, filed on Oct. 20, 2006, provisional application No. 60/890,973, filed on Feb. 21, 2007.

(51) Int. Cl.
| | |
|---|---|
| *G06F 19/00* | (2006.01) |
| *G06F 12/00* | (2006.01) |
| *G06F 12/14* | (2006.01) |
| *G06F 13/14* | (2006.01) |
| *G05B 21/00* | (2006.01) |

(52) U.S. Cl. .......... 700/99; 700/100; 700/101; 710/200; 710/240

(58) Field of Classification Search .................... None
See application file for complete search history.

(56) References Cited

U.S. PATENT DOCUMENTS

| | | | |
|---|---|---|---|
| 3,928,772 A | 12/1975 | Mooney | |
| 4,118,635 A | 10/1978 | Barrett et al. | |
| 4,215,396 A | 7/1980 | Henry | |
| 4,519,027 A | 5/1985 | Vogelsberg | |
| 4,570,217 A | 2/1986 | Allen et al. | |
| 4,581,701 A | 4/1986 | Hess et al. | |
| 4,602,324 A | 7/1986 | Fujawa et al. | |
| 4,910,691 A | 3/1990 | Skeirik | |
| 4,985,824 A | 1/1991 | Husseiny et al. | |
| 4,990,057 A | 2/1991 | Rollins | |
| 5,058,043 A | 10/1991 | Skeirik | |
| 5,068,778 A | 11/1991 | Kosem et al. | |
| 5,088,024 A * | 2/1992 | Vernon et al. | 710/111 |
| 5,214,577 A | 5/1993 | Sztipanovits et al. | |
| 5,255,197 A | 10/1993 | Iida | |

(Continued)

FOREIGN PATENT DOCUMENTS

EP 1770464 4/2007

OTHER PUBLICATIONS

OA dated Apr. 6, 2010 for U.S. Appl. No. 11/855,646, 24 pages.

(Continued)

*Primary Examiner* — Jeffrey A Gaffin
*Assistant Examiner* — Sunray Chang
(74) *Attorney, Agent, or Firm* — Turocy & Watson, LLP; William R. Walbrun; John M. Miller

(57) ABSTRACT

Arbitrating access to industrial resources as a function of controller identify is provided herein. For example, a unique identifier can be associated with a control module that can distinguish the module from other components of a system. Upon receiving a request to control a resource, the identifier of the requesting module can be associated with that resource. In a case of multiple requests, an arbitrated ID can be chosen and added to an owner queue. The chosen ID is then published and, if the published identifier matches the module identifier, the module can assume control of the resource; if not, the module's request is placed into a request queue for further arbitration. The subject innovation provides for generally applicable arbitration that can reduce redundant code crafted for each module of a system, greatly reducing overhead costs associated with such redundancy.

29 Claims, 14 Drawing Sheets

U.S. PATENT DOCUMENTS

| | | | |
|---|---|---|---|
| 5,262,954 A | 11/1993 | Fujino et al. | |
| 5,388,318 A | 2/1995 | Petta | |
| 5,420,977 A | 5/1995 | Sztipanovits et al. | |
| 5,450,346 A | 9/1995 | Krummen et al. | |
| 5,555,179 A | 9/1996 | Koyama et al. | |
| 5,673,194 A | 9/1997 | Cipelletti et al. | |
| 5,751,582 A | 5/1998 | Saxena et al. | |
| 5,880,954 A | 3/1999 | Thomson et al. | |
| 5,920,717 A | 7/1999 | Noda | |
| 5,933,347 A | 8/1999 | Cook et al. | |
| 5,946,212 A | 8/1999 | Bermon et al. | |
| 6,008,985 A | 12/1999 | Lake et al. | |
| 6,061,600 A | 5/2000 | Ying | |
| 6,289,252 B1 | 9/2001 | Wilson et al. | |
| 6,397,114 B1 | 5/2002 | Eryurek et al. | |
| 6,449,624 B1 | 9/2002 | Hammack et al. | |
| 6,459,944 B1 | 10/2002 | Maturana et al. | |
| 6,501,995 B1 | 12/2002 | Kinney et al. | |
| 6,527,018 B2 | 3/2003 | Yamauchi et al. | |
| 6,535,769 B1 | 3/2003 | Konar | |
| 6,563,891 B1 | 5/2003 | Eriksson et al. | |
| 6,615,091 B1 | 9/2003 | Birchenough et al. | |
| 6,622,155 B1 * | 9/2003 | Haddon et al. | 718/100 |
| 6,662,061 B1 | 12/2003 | Brown | |
| 6,675,324 B2 | 1/2004 | Marisetty et al. | |
| 6,708,104 B2 | 3/2004 | Avery et al. | |
| 6,760,630 B2 | 7/2004 | Turnaus et al. | |
| 6,832,118 B1 | 12/2004 | Heberlein et al. | |
| 6,853,920 B2 | 2/2005 | Hsiung et al. | |
| 6,859,755 B2 | 2/2005 | Eryurek et al. | |
| 6,865,432 B2 | 3/2005 | Brown | |
| 6,948,059 B1 * | 9/2005 | Sprecher et al. | 713/100 |
| 6,996,741 B1 | 2/2006 | Pittelkow et al. | |
| 7,058,712 B1 | 6/2006 | Vasko et al. | |
| 7,089,155 B2 | 8/2006 | Hegel | |
| 7,089,530 B1 | 8/2006 | Dardinski et al. | |
| 7,117,504 B2 | 10/2006 | Smith et al. | |
| 7,123,978 B2 | 10/2006 | Hartman et al. | |
| 7,149,595 B2 * | 12/2006 | D'Mura | 700/96 |
| 7,162,534 B2 | 1/2007 | Schleiss et al. | |
| 7,171,281 B2 | 1/2007 | Weber et al. | |
| 7,249,356 B1 | 7/2007 | Wilson et al. | |
| 7,254,457 B1 | 8/2007 | Chen et al. | |
| 7,289,861 B2 | 10/2007 | Aneweer et al. | |
| 7,307,986 B2 | 12/2007 | Henderson et al. | |
| 7,313,453 B2 | 12/2007 | Kline | |
| 7,333,024 B2 | 2/2008 | Nickolaou et al. | |
| 7,415,708 B2 | 8/2008 | Knauerhase et al. | |
| 7,424,331 B2 | 9/2008 | Patel | |
| 7,506,090 B2 * | 3/2009 | Rudnick et al. | 710/240 |
| 7,620,465 B2 | 11/2009 | Degoul et al. | |
| 7,725,200 B2 | 5/2010 | Reed et al. | |
| 2001/0049562 A1 | 12/2001 | Takano et al. | |
| 2002/0010908 A1 | 1/2002 | Cheng et al. | |
| 2002/0042896 A1 | 4/2002 | Johnson et al. | |
| 2002/0059467 A1 | 5/2002 | Rapp et al. | |
| 2002/0091826 A1 * | 7/2002 | Comeau et al. | 709/226 |
| 2002/0100014 A1 | 7/2002 | Iborra et al. | |
| 2003/0051071 A1 | 3/2003 | Stefansson et al. | |
| 2003/0149756 A1 | 8/2003 | Grieve et al. | |
| 2003/0177018 A1 | 9/2003 | Hughes | |
| 2003/0220709 A1 | 11/2003 | Hartman et al. | |
| 2004/0095833 A1 | 5/2004 | Marisetty et al. | |
| 2004/0158713 A1 | 8/2004 | Aneweer et al. | |
| 2004/0172612 A1 | 9/2004 | Kasravi et al. | |
| 2004/0181294 A1 | 9/2004 | Deitz et al. | |
| 2004/0243260 A1 | 12/2004 | Law et al. | |
| 2004/0267515 A1 | 12/2004 | McDaniel et al. | |
| 2005/0004781 A1 | 1/2005 | Price et al. | |
| 2005/0015769 A1 | 1/2005 | Gegner | |
| 2005/0028133 A1 | 2/2005 | Ananth et al. | |
| 2005/0125512 A1 | 6/2005 | Fuller et al. | |
| 2005/0227217 A1 | 10/2005 | Wilson | |
| 2006/0026193 A1 | 2/2006 | Hood | |
| 2006/0085084 A1 | 4/2006 | Nickolaou et al. | |
| 2006/0101433 A1 * | 5/2006 | Opem et al. | 717/140 |
| 2006/0230383 A1 | 10/2006 | Moulckers et al. | |
| 2006/0259157 A1 | 11/2006 | Thurner | |
| 2006/0265688 A1 | 11/2006 | Carlson et al. | |
| 2006/0265695 A1 | 11/2006 | Arai | |
| 2007/0061125 A1 | 3/2007 | Bhatt et al. | |
| 2007/0089100 A1 | 4/2007 | Morris et al. | |
| 2007/0100486 A1 | 5/2007 | Burda et al. | |
| 2007/0101193 A1 | 5/2007 | Johnson et al. | |
| 2007/0162268 A1 | 7/2007 | Kota et al. | |
| 2007/0186090 A1 | 8/2007 | Yu et al. | |
| 2007/0220483 A1 | 9/2007 | Motoyama et al. | |
| 2007/0234283 A1 | 10/2007 | Baluja et al. | |
| 2007/0261027 A1 | 11/2007 | Dhanakshirur et al. | |
| 2007/0269297 A1 | 11/2007 | Van Der Meulen et al. | |
| 2007/0294450 A1 * | 12/2007 | Rudnick et al. | 710/244 |
| 2008/0082186 A1 | 4/2008 | Hood et al. | |
| 2008/0097624 A1 * | 4/2008 | Weatherhead et al. | 700/9 |
| 2008/0120129 A1 | 5/2008 | Seubert et al. | |
| 2008/0126407 A1 | 5/2008 | Shimaoka et al. | |
| 2008/0188960 A1 | 8/2008 | Nixon et al. | |

OTHER PUBLICATIONS

OA dated Mar. 10, 2010 for U.S. Appl. No. 11/861,562, 24 pages.
ANSI/ISA-88.01-1995. Batch Control, Part 1: Models and Terminology.
Maffezzoni, et al. Object-oriented models for advanced automation engineering. www.elsevier.com/locate/conengprac.
Office Action dated Sep. 16, 2010 for U.S. Appl. No. 11/774,824, 32 pages.
OA mailed Oct. 29, 2009 for U.S. Appl. No. 11/856,563, 55 pages.
OA mailed Dec. 17, 2009 for U.S. Appl. No. 11/855,646, 23 pages.
OA mailed May 5, 2009 for U.S. Appl. No. 11/864,664, 21 pages.
OA mailed May 13, 2009 for U.S. Appl. No. 11/864,733, 23 pages.
OA mailed May 12, 2009 for U.S. Appl. No. 11/856,563, 30 pages.
OA mailed May 6, 2009 for U.S. Appl. No. 11/864,678, 22 pages.
Siemens, "SIMATIC BATCH Getting Started", Parts 1 to 4, Jan. 2005, Siemens AG, 196 pages.
OA dated Mar. 2, 2011 for U.S. Appl. No. 11/774,824, 18 pages.
OA dated Apr. 28, 2011 for U.S. Appl. No. 11/864,134, 51 pages.
Maffezzoni, et al. "Object-oriented models for advanced automation engineering." Apr. 1999. Control Engineering Practice 7, pp. 957-968.
The Instrumentation System and Automation Society, "Batch Control, Part 1: Models and Terminology." ANSI/ISA-88.01-1995. The Instrument Society of America, 1995. 96 pages.

* cited by examiner

MODULE ARBITRATION AND OWNERSHIP ENHANCEMENTS

CROSS REFERENCE TO RELATED APPLICATIONS

This application claims the benefit of U.S. Provisional Patent Application No. 60/862,403, filed on Oct. 20, 2006, entitled MODULE CONTROL AND STATE PROPAGATION. This application also claims the benefit of U.S. Provisional Patent Application No. 60/890,973, filed on Feb. 21, 2007, entitled MODULE CONTROL AND STATE PROPAGATION. The entireties of the aforementioned applications are incorporated herein by reference.

TECHNICAL FIELD

The claimed subject matter relates generally to industrial control systems and more particularly to module class components and arbitration of use and ownership of shared industrial resources.

BACKGROUND

One type of industrial control process is referred to as a batch process, which involves subjecting raw materials to processing steps using one or more pieces of equipment to produce a "batch" of product. Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application).

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Batch-processing equipment (i.e., controllable elements such as valves, heaters, mixers, and so forth) is operated according to procedures to produce a batch. Generally, such equipment is referred to synonymously as equipment, equipment modules, processing equipment, or physical elements. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. Typically, the levels of the S88.01 procedural model of a particular application are, in descending order: the "procedure;" the "unit procedure;" the "operation;" and the "phase."

The term "procedural element" generally refers to components that employ any of the levels of the S88.01 procedural model, not just to those of the "procedure" level or any other single level of the procedural model. The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

Today, industrial module class components often compete for resources within a plant. For instance, three equipment modules may need to control a common valve that supplies materials to the respective equipment controlled by the modules. This competition for shared resources often required a designer to construct arbitration code for each module in order to have access and control of the valve at a given time. In addition, the arbitration code can often be particular to a module or to a shared resource, requiring additional code to be crafted and tailored to other industrial components. Furthermore, timing/synchronization problems often had to be debugged on site after implementing such arbitration code. A common result of these requirements is an increase in time needed to prepare an industrial process for production, and an increase in overhead costs associated with the industrial process.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Arbitration functionality is provided within a given module in an industrial setting in order to mitigate custom arbitration coding requirements. A unique identifier is associated with each module, where the identifier is employed for arbitration between the modules. For example, if three equipment modules request a common valve, the first request received could lock out the other two requests until the first was processed. All three modules can be apprised of the competing ID's that are currently accessing a resource. As can be appreciated various arbitration algorithms can be provided.

According to additional aspects, arbitration can be located in each control module (or other type module, e.g., arbitration scheme devised for equipment level arbitration) of an industrial process. In addition, an ownership mechanism can be placed in each control module, for example. The ownership mechanism enables higher level objects (e.g., equipment modules) to evaluate a state of arbitration within a control module. If the control module is arbitrated, and is interlocked for use, an equipment module (e.g., able to determine its own identity) can evaluate a current owner of the control module. If an equipment module making the evaluation determines it is the owner of the control module, the equipment module (through its arbitrated control mechanism) can be permitted to command the control module. By leveraging S88 (or other) standard, a hierarchical arbitration scheme can be provided which can be embedded within each module.

To the accomplishment of the foregoing and related ends, certain illustrative aspects are described herein in connection with the following description and the annexed drawings. These aspects are indicative of various ways that can be practiced, all of which are intended to be covered herein.

Other advantages and novel features may become apparent from the following detailed description when considered in conjunction with the drawings.

DETAILED DESCRIPTION

Arbitrating control of shared industrial resources amongst multiple industrial module class components as a function of identity of such component is provided herein. For example, a unique identifier associated with an industrial control module can distinguish the module from other components of the system. Upon receiving a request to control a resource, the identifier of the requesting module can be published to other system components. If the published identifier matches the module identifier, the module can assume control of the resource. Otherwise, the request for control is placed into a request queue for processing by various arbitration algorithms that determine a control order. As described, aspects of the subject innovation can reduce or eliminate a need for custom arbitration coding amongst modules and resources of an industrial system. The result can be greatly reduced overhead costs and pre-production delays associated with such a system.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
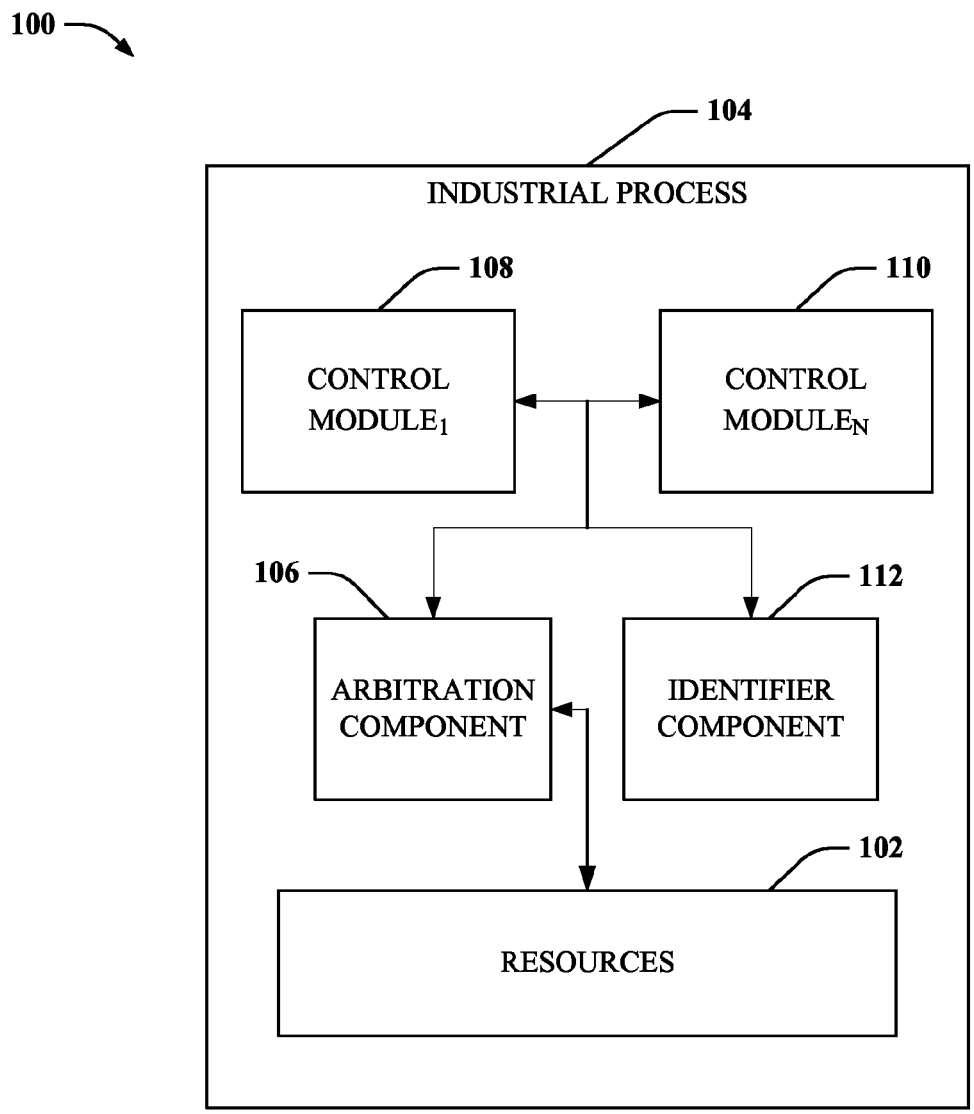
FIG. 1 depicts a block diagram of an example system that provides arbitration for industrial module class components for an industrial automation system.

Referring initially to FIG. 1, a system 100 is depicted that provides arbitration of a shared industrial resource 102 for an industrial process 104. Specifically, an arbitration component 106 receives a control request from multiple control modules (108, 110) of the industrial process 104. The arbitration component 106 then determines an order in which the modules (108, 110) can access the resource 102, and facilitate such access according to the determined order. For example, a module given first priority (control module₁ 108) can access the resource 102 while remaining modules (up through and including control module_N 110) are denied access to the resource 102. When control module₁ 108 relinquishes access to the resource 102, a module given second priority (e.g., control module_N 110) can then access and control the resource 102. By utilizing arbitration, system 100 mitigates conflicting commands delivered to a single resource by different controllers (108, 110). In circumstances where multiple control modules attempt to access a resource 102 concurrently, system 100 can help to facilitate proper execution of system components instead.

For instance, a 'race condition' can occur where two control modules (108, 110) attempt to access and direct execution of an industrial resource 102 concurrently. Various problems can result from such condition. For example, if multiple devices (108, 110) access and deliver inconsistent or exclusive commands to the resource 102, a malfunction can occur and the commands can be executed incorrectly or not executed at all. As another example, the resource 102 can respond to commands of only one of the control devices (108, 110) and be non-responsive to the other(s) (108, 110). Consequently, some devices (108, 110) can prematurely execute logic because of such non-responsiveness. To address these potential problems, the arbitration component 106 determines an access/control order for multiple control devices to facilitate efficient utilization of resources. More specifically, arbitration can help to mitigate malfunctioning and/or non-responsive conditions by providing access to the industrial resource 102 for a single control module (108, 110) at a time, and denying access to other control modules (108, 110) at such time (or, e.g., to a group of control modules (108, 110) designed to work synchronously with the industrial resource).

The industrial process 104 of system 100 can also include an identifier component 112 that facilitates arbitration of control of one or more components and/or resources of system 100. Arbitration can be between one or more control modules/components (108, 110). Particularly, identifier component 112 can generate a unique ID for one or more control modules (108, 110) to assist the arbitration component 106 in identifying the modules (108, 110). For instance, identifier component 112 can generate a unique ID associated with control module₁ 108 and control module_N 110. The unique ID's can be provided to the arbitration component 106 to assist in determining an access order for the control modules 108, 110. If access to resource 102 is granted, the unique ID associated with a control module (108, 110) can be further associated with the request and provided to resource 102.

If resource 102 is not currently controlled by another industrial component when the arbitration component 106 receives a control request, access and control of the resource 102 can pass to a requesting control module (108, 110). The association between a unique ID and a request/control of resource 102 can also be utilized to apprise other industrial components (e.g., controllers, resources, etc.) that the resource 102 is being controlled by a control module (108, 110). Such components could then place a control request (including an additional unique ID generated by identifier component 112 or an additional identifier component (108) assigned to such device(s)) in a queue, for instance, to facilitate access and control of resource 102 when it is available.

As discussed above, the arbitration component 106 can also deny access to control modules (108, 110) where suitable. For instance, if control module$_1$ 108 has accessed and is in control of a resource 102 (and, e.g., its ID is associated with the resource 102), the arbitration component 106 can deny access to the resource 102 for control module$_N$ 110. Denial of access can persist until a time when control module$_1$ 108 is no longer accessing/controlling resource 102.

The arbitration component 106 can utilize various arbitration algorithms to prioritize multiple concurrent (e.g., within a threshold period) requests for control of the resource 102. For instance, a first come first serve (FCFS) algorithm can be employed, wherein a module ID and request for control that is first received at arbitration component 106 (or, e.g., at the resource 102 itself) can be provided access to the resource 102. Other modules (108, 110) can be denied access to resource 102 so long as a first module ID is associated with the resource 102. When resource 102 is available for control (e.g., no module ID is associated there with), a second received ID and request can be executed, and so on. Alternatively, a highest priority first serve (HPFS) algorithm can be employed, wherein a module ID can be associated with a module priority number (e.g., generated by identifier component 112 or related component). If several module IDs and requests for control are received at the arbitration component 106 (e.g., within a threshold period of time), a module having the highest priority number can be provided access to the resource 102. It is to be understood that various algorithms for arbitrating between one or more control modules (108, 110) can be utilized by the arbitration component 106, including those articulated above, combinations thereof, and combinations of these and other suitable algorithms.

Also of note, the industrial process 104 can include any suitable combination of industrial controllers (e.g., programmable logic controller (PLC)), control emulators, power supplies, communication bus structures, hardware devices (e.g., motor, pump, refrigerator, conveyor, weight scale, material flow valve, and so on), software modules (e.g., control modules, equipment modules, etc.), logical operators, and so on. In addition, each of the components of the industrial process 104 can be configured to interact with various other components in order to perform tasks (e.g., open a valve to dispense stored material, move an object across a conveyor, or maintain a predetermined temperature), respond to certain conditions (e.g., fill a container that falls below a threshold weight, activate a conveyor to move a load that rises above a threshold weight, or power a refrigeration module if a temperature rises above a threshold), maintain and/or track a state (e.g., a task number) and provide system feedback (e.g., by way of system alarms).

The industrial process 104 can also include at least one control module (108, 110) and various industrial resources (102). The control module(s) (108, 110) can be any suitable process, component, device, and/or machine that can access, control, prioritize, or apply the resources 102 to a particular task. For instance, control module$_1$ 108 (or, e.g., control module$_N$ 110) can be a programmable logic controller (PLC), an equipment module, a logic operation or thread of execution that can conduct an industrial component in accomplishing a task, and so on. Additionally, the control module(s) (108, 110) can be a group of industrial components (e.g., equipment modules, control modules, resource control modules, and so on) designed to interact in a synchronized manner with the resource 102 (e.g., the multiple components can be synchronized to enable multiple successful interactions with the resource 102 either concurrently or in rapid succession). Resources 102 can include any suitable industrial resource associated with an industrial process 104 including modules of the industrial process 104 (e.g., a control module, an equipment module, a resource control module, etc.) a physical device such as a motor, conveyor, pump, electrical power source, material storage device, material flow shut-off valve, and so on, personnel resources (e.g., input/output information such as verification of a result, or a task performed by a industrial technician, etc.), and like resources of an industrial automation system.

As detailed above, system 100 can help to mitigate damage and confusion resulting from concurrent access to an industrial resource 102 by multiple control modules (108, 110). In addition, system 100 can reduce overhead costs and time to production delays associated with conventional arbitration. Specifically, by employing an arbitration component 106 and an identifier component 112, a single control module (108, 110) (or synchronized modules) can control the resource 102 at one time, and other components (not depicted) can be notified of the control to redirect attempts at concurrent control. The control and notification can be based on an ID of the control module (108, 110) being associated with the resource 102, for instance. Specifically, access can be granted only to a module (108, 110) whose ID is associated with the resource 102, and access by all other modules can be denied. Consequently, repeated instances of arbitration logic, crafted for independent modules of a system, which arbitrate and/or synchronize access for to system resources, can be avoided.

As will be described in more detail below, the control modules (108, 110), identifier component 112, or resource(s) 102 can be an association of logic with one or more resources. The logic includes program code that can alter the state of a resource for example, ladder code, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules hide the user from internal interfaces, messages, and logic specific to the resources yet provide standard or generic interfaces to external systems or between components.

Modules may include other modules including nested modules where standard module behaviors and attribute patterns can be represented using common data model representations for module classes, module templates and module inheritance. Module classes and templates can be maintained in libraries that facilitate access to desired system functionality and further promote system integration. Resources can have various states associated therewith such as common S88 state classifications including idle, hold, abort, run, reset, stop, restart, and so forth where the module can present logic to represent state machines that manage the state of a resource. During application, resource modules (described below) can take on the name of the resource that is the primary focus of the module. For example, an equipment module is primarily focused on coordination of equipment (e.g., motors, pumps, conveyors, valves, and so on) but may involve personnel in the process. Similarly, a personnel module is focused on coordination of personnel but may involve other resources in the process. A control module (e.g., control module 108, 110) that manages a material may be referred to as a material control module and so forth.

It is noted that components associated with the system 100 can include various computer or network components such as servers, clients, programmable logic controllers (PLCs), communications modules, mobile computers, wireless components, and/or control components and so forth, which are capable of interacting across a network. Similarly, the term PLC as used herein can include functionality that can be shared across multiple components, systems, and/or networks. For example, one or more PLCs can communicate and cooperate with various network devices across the network. This can include substantially any type of control, communications module, computer, I/O device, sensor, Human Machine Interface (HMI), and the like, that communicates via the network, which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices. In addition to the foregoing, it is noted that components associated with the system 100 can include presence sensing devices, safety switches, interlock switches, safety relays, emergency stop devices, cable pulls & enabling switches, safety controllers, and so forth, which are capable of interacting to form a safety system.

Figure 2:
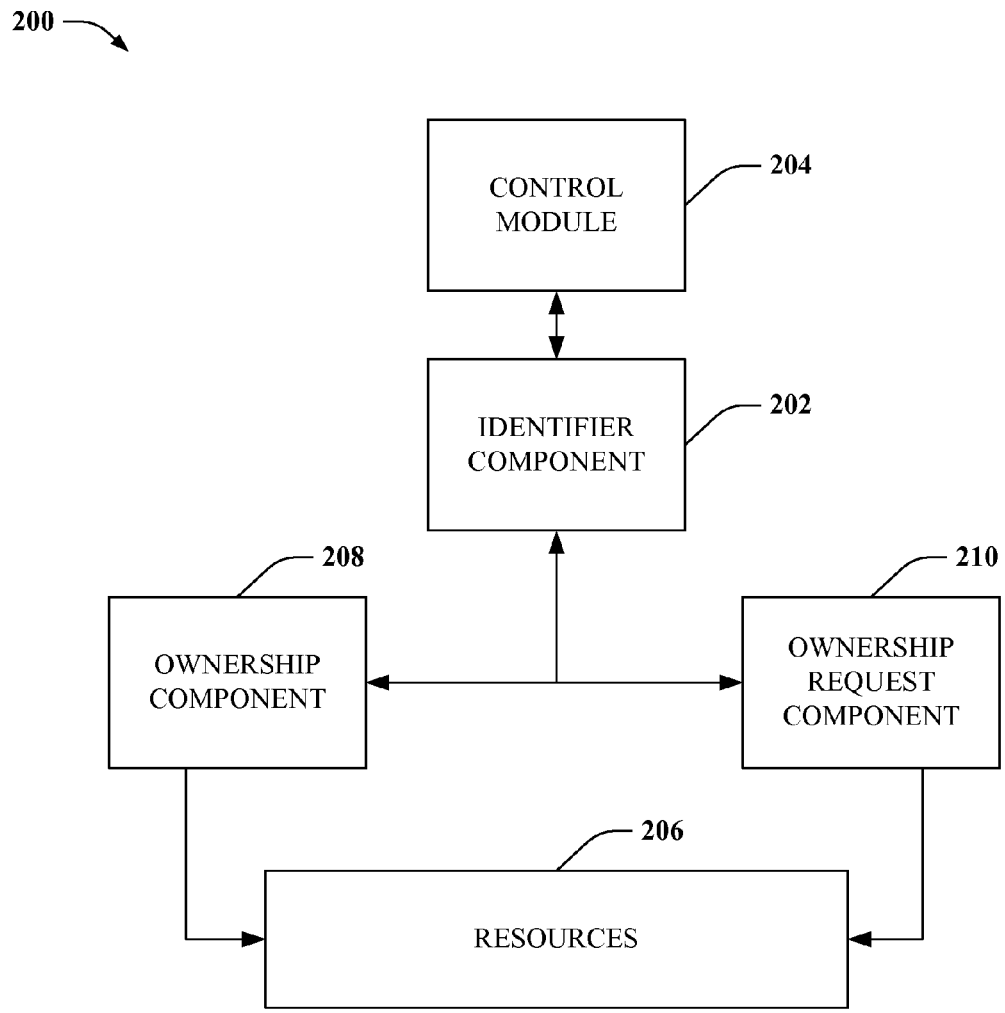
FIG. 2 illustrates a block diagram of an example system that provides for arbitration as a function of ownership associated with one or more industrial resources.

Referring now to FIG. 2, block diagram of an example system 200 that provides for arbitration as a function of ownership is illustrated. System 200 includes an identifier component 202 that generates a unique ID for an industrial control module 204. The unique ID can be provided to identifier component 202 by control module 204 in conjunction with a request for control of resources 206, for instance. Furthermore, if the control module 204 is granted access to the resources 206, the identifier component 202 associates the unique ID with such resources 206 to facilitate control thereof and to notify other system components of such control.

System 200 also includes an ownership component 208 that provides control of a resource 206 of an industrial process to control module 204. Such control can be conditioned on whether an ID of the module (204) generated by identifier component 202 is associated with the resource 206. For instance, identifier component 202 can write an ID of a control module 204 into a queue (e.g., a bit, byte, memory counter, or other allocated memory, not depicted) associated with the resource 206. Ownership component 208 can then refer to the queue to determine whether access/control of resource 206 should be given and to which industrial component (204). Thus, ownership component 208 provides control and access to the resource 206 based on the ID written to the ownership queue. Together the ownership component 208 and ownership queue establish a notion of contemporaneous control, or ownership, of an industrial resource 206. System 200 therefore, can identify (e.g., by arbitration) one or more particular modules (204) to have control of the resource 206, associate an ID of the module(s) 204 with the resource 206 for duration of the control, and deny access to the resource 206 for additional modules (204) not affiliated with the ID.

In addition, ownership information can be provided to other components of an industrial system to notify them that a resource 206 is in use (and not yet accessible). Such notification can be used to route a request for control into a request queue, for instance (see, e.g., FIG. 4 for a depiction and discussion of request queue). Consequently, system efficiency is enhanced by mitigating redundant or untimely requests sent to ownership component 208.

At 210, an ownership request component is depicted that receives a request to control a resource 206 of an industrial automation system if such resource is already controlled by control module 204. For instance, if an ID is written to a queue associated with the resource 206, then a request for such resource 206 can be received by and/or routed to ownership request component 210. Ownership request component 210 can then place the request and an ID of a module (204) initiating the request into a request queue (not depicted). The request queue can be any suitable memory (e.g., bit, byte, counter, allocated portion of a data store, etc.) associated with resource 206 that receives, stores, updates and/or erases requests for control of the resource 206 and IDs of modules (204) initiating such requests.

As an example to provide context for aspects of system 200, a material flow shut-off valve can be a particular resource (206) of an industrial automation system. For instance, the shut-off valve (206) can control flow of fuel (e.g., gasoline, natural gas, hydrogen fuel, and so on), coolant (e.g., air, water, liquid nitrogen, or the like), lubricant (e.g., oil), and various other materials suitable for powering or otherwise operating automated industrial machinery. Various control modules (204) associated with industrial machinery can include logic for accessing and controlling the shut-off valve in order to dispense a material used to operate a machine (e.g., to dispense oil for lubricating a moving part, dispense fuel for powering a motor or pump, stopping/starting/changing a flow rate of a dispensed material(s) according to safety requirements, and so on). As a particular example, two control modules (204) associated with different machines can attempt to access the shut-off valve (206) concurrently (e.g., within a threshold period of time). Each module (204) provides a request for control identifying the shut-off valve (206) along with a unique ID associated with the module (204). These requests can be received at an arbitration component (e.g., as depicted at 106 of FIG. 1, supra) that can arbitrate between the two modules (204) to determine which is provided first access to the shut-off valve (206). Arbitration can be based on a FCFS algorithm, a HPFS algorithm, or combinations of these or like arbitration algorithms. Further, the arbitration can incorporate module importance to provide higher priority access to predetermined modules or class of modules (e.g., safety modules).

When control of the shut-off valve is determined, the 'winning' module ID can be written to a queue associated with the shut-off valve (206). An ownership component 208 can then provide access and control of the shut-off valve (206) to the 'winning' module. The ID of the 'losing' module can be written by an ownership request component (210) to a request queue associated with the shut-off valve (206). The request queue can simply act as a holding position for control requests while the shut-off valve is serving the 'winning' (or, e.g., a subsequently served) module (204). When the 'winning' module has finished use of the shut-off valve, a control release command can be provided to identifier component 202 and forwarded to ownership component 208. Upon receiving such command, ownership component 208 can erase the queue associated with the shut-off valve (206), and update it with an ID and request in the request queue (e.g., initiated by the 'losing' module).

In addition, if an additional request for control is received by the identifier component (202) while the shut-off valve (206) is utilized by the 'winning' module (204), such request and a module ID can be forwarded directly to ownership request component 210 to be placed in a request queue (e.g., because the queue associated with the shut-off valve (206) already has a module ID of the 'winning' module written to it). Additional arbitration can be performed (e.g., see FIG. 1, supra) for multiple requests in the request queue. For instance, even though the additional request arrived after the 'losing' module (204) request, the additional request can be provided access to the shut-off valve (206) before the 'losing' module in certain circumstances (e.g., when an HPFS arbitration algorithm is employed and the additional request has a higher priority than the 'losing' request).

As described, system 200 provides for management of multiple requests for a resource 206 utilizing a general arbitration algorithm or set of algorithms. Such management facilitates a more cost efficient mechanism for implementing arbitration as compared with conventional techniques. In addition, further examples of request management and control arbitration are provided below in order to satisfy other potential conflict or 'race' conditions for an industrial automation system.

As an additional example, system 200 can also represent a safety system. Specifically, control module 204 or resources 206, or both, can include components of a safety system, such as safety devices (e.g., presence sensing devices, safety switches, interlock switches, safety relays, emergency stop devices, cable pulls & enabling switches, or the like), which can typically belong to a safety system (200). Additionally, identifier component 202 can determine and/or provide a unique ID for components of the safety system (200) to distinguish these components within the safety system.

According to particular embodiments, a safety controller (204) can have limited resources (206) with which to maintain functional safety requirements of the system (200). For a functional safety system (200), control module 204 can include additional components, such as a Safety Integrity Level component(s) (SIL) and/or a Performance Level component(s) (PL), or the like, e.g., as defined in industry standards dedicated to safety systems such as IEC61508, IEC61511, IEC 61326-3-1, IEC 61784-3. Further, resources (206) associated with system 200 can include any suitable material, module, component etc., of an industrial process necessary to maintain an SIL or PL as required by the foregoing and/or like industry standards.

If additional safety devices (204) are added to the safety system 200, they can each request ownership of safety resources (206) as required. Multiple concurrent requests can be placed in a request queue, as described above. The ownership component 208 can determine resources required by the requesting device (204), according to identity, and compare the request to the available resources (206). Ownership of resources may then be granted or denied, and the identity of the requesting device (204) removed from the request queue. For example, if a sum of an existing safety component ID and the requesting safety component ID are within resource limits required to maintain an SIL or PL device, access can be granted to a requesting device (204). If, however, the sum of the safety component ID currently associated with the resource 206 and the requesting safety component ID will exceed a boundary required by the SIL or PIL device, the requesting ID can be placed into the request queue instead.

Figure 3:
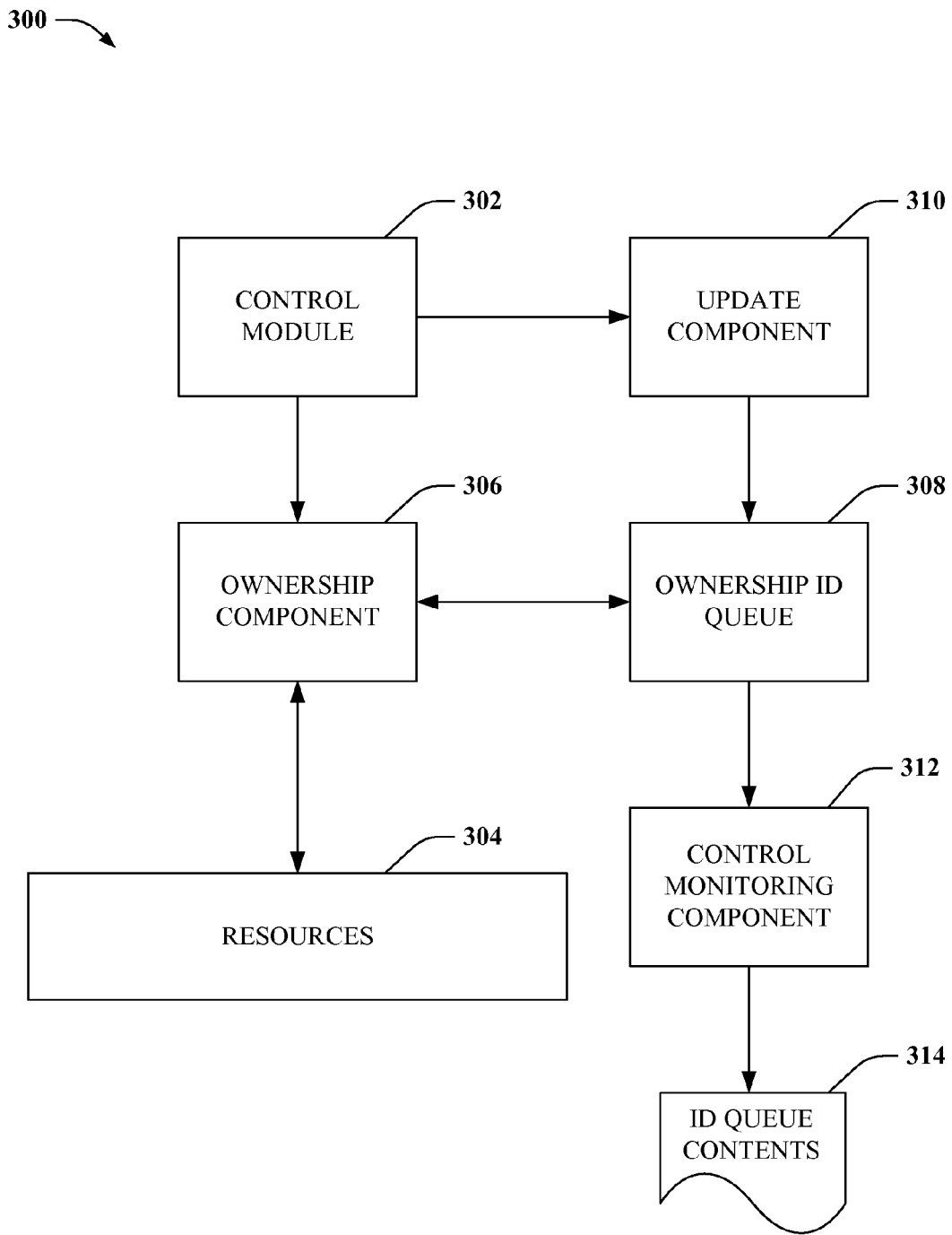
FIG. 3 depicts a block diagram of an example system that can monitor ownership of an industrial resource and notify system components of the ownership.

Referring to FIG. 3, a system 300 is depicted that monitors ownership of an industrial resource and notifies system components of the ownership. Particularly, system 300 includes a control module 302 that initiates a request to control a resource 304 of an industrial automation system. The control request can include a unique ID of the module 302 and can be received at an ownership component 306. Upon receipt of the request, ownership component 306 references an ownership ID queue 308 to determine whether another device ID is concurrently in control/ownership of the resource 304. If not, ownership component 306 provides access and control of resource 304 to control module 302.

System 300 also includes an update component 310 that writes an ID of control module 302 into ownership ID queue 308 (e.g., associated with resource 304). For instance, update component 310 can write the ID of control module 302 into the ownership ID queue 308 if the module 302 is determined to be a concurrent owner of an industrial resource 304 (e.g., if no module ID is written into the ownership ID queue 308 when a request from control module 302 is received at ownership component 306). Ownership component 306 also references the ownership ID queue 308 in determining whether to provide access and control of resource 304 to control module 302. If an ID of control module 302 is in the ownership ID queue 308, access is given. Otherwise, access is denied.

At 312 is depicted a control monitoring component that audits the ownership ID queue 308 and determine whether a control module (302) is a concurrent owner of resource 304. Specifically, whether a module ID is written to the ownership ID queue 308 is determined. If such is the case, control monitoring component 312 also publishes the contents of the ownership ID queue (314) throughout an industrial network (and/or, e.g., make ownership information available upon request by network devices). Publication can be utilized in order to notify additional modules that the resource 304 is in use and to identify the module(s) (302) that has ownership of the resource 304, for instance. Consequently, such additional devices can place a control request into a request queue, for instance, to await arbitration and/or access to the resource 304.

Figure 4:
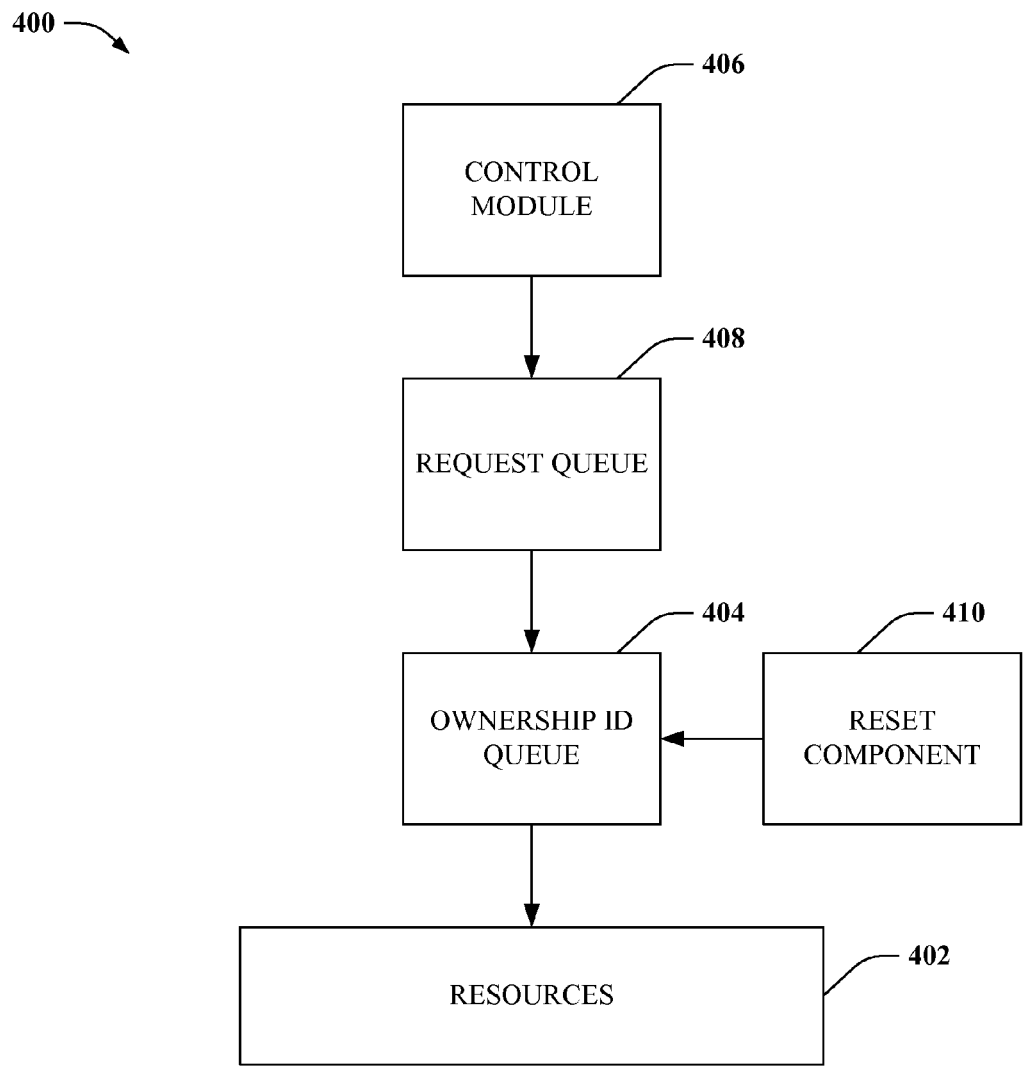
FIG. 4 depicts a block diagram of an example system that can process, queue and update control requests for an industrial resource.

Referring to FIG. 4, a block diagram of an example system 400 that processes, queues and updates control requests for an industrial resource 402 is depicted. The industrial resource 402 can include any suitable controller, material, machine, program module, logical process, or personnel resource pertaining to an industrial automated system (as described herein). The resource 402 is affiliated with an ownership ID queue 404 that contains an ID of a control module 406 currently having access to and ownership of the resource 402. Ownership of resource 402 enables control module 406 to direct, appropriate, instruct, provide/receive information from, etc., the resource 402. For instance, control of a shut-off valve resource can enable control module 406 to dispense material stored within a container associated with the shut-off valve (e.g., see FIG. 2, supra). If no device (406) has control of resource 402, the ownership ID queue 404 is empty.

System 400 also includes a request queue 408. Request queue 408 serves as a place to store a control request from module 406 if an ID of another device (not depicted) is written in the ownership ID queue 404 (and, e.g., already in control of the resource 402). Request queue 408 can store multiple requests for ownership of resource 402 from multiple control modules (406). Multiple requests are prioritized by an arbitration algorithm (e.g., FCFS, HPFS) establishing a priority of access to resource 302.

At 410 a reset component is depicted that erases the contents of ownership ID queue 404. For instance, if a control module 406 having ownership of resource 402 sends an ownership termination command indicating that the module (406) no longer requires ownership of the resource 402, reset component 410 can erase ownership ID queue 404. As a result, another request (if present) stored in request queue 408 is loaded into ownership ID queue 404, and a module (406) initiating such request takes ownership and control of resource 402. As described above, if multiple requests are stored in request queue 408, a priority order can be established by an arbitration algorithm.

System 400 provides a substantial improvement over conventional arbitration mechanisms. Specifically, system 400 provides a general purpose resource request management system that employs one or more arbitration algorithms based on an ID of a requesting module (and/or, e.g., a priority factor associated with the ID). Specific synchronization and arbitration code tailored to each individual control module, or groups of control modules, can be avoided. Because drafting repeated instances of arbitration/synchronization code is time consuming and expensive, system 400 can provide substantial cost-reduction and time to production benefits over these conventional techniques.

In view of the exemplary systems described supra, methodologies that may be implemented in accordance with the disclosed subject matter will be better appreciated with reference to the flow charts of FIGS. 5-9. While for purposes of simplicity of explanation, the methodologies are shown and described as a series of blocks, it is to be understood that the claimed subject matter is not limited by the order of the blocks. For example, some blocks may occur in different orders and/or concurrently with other blocks from what is depicted and described herein. Moreover, not all illustrated blocks may be used to implement the disclosed methodologies. Additionally, the methodologies disclosed throughout this specification are capable of being stored on an article of manufacture to facilitate transporting and transferring such methodologies to computers.

Figure 5:
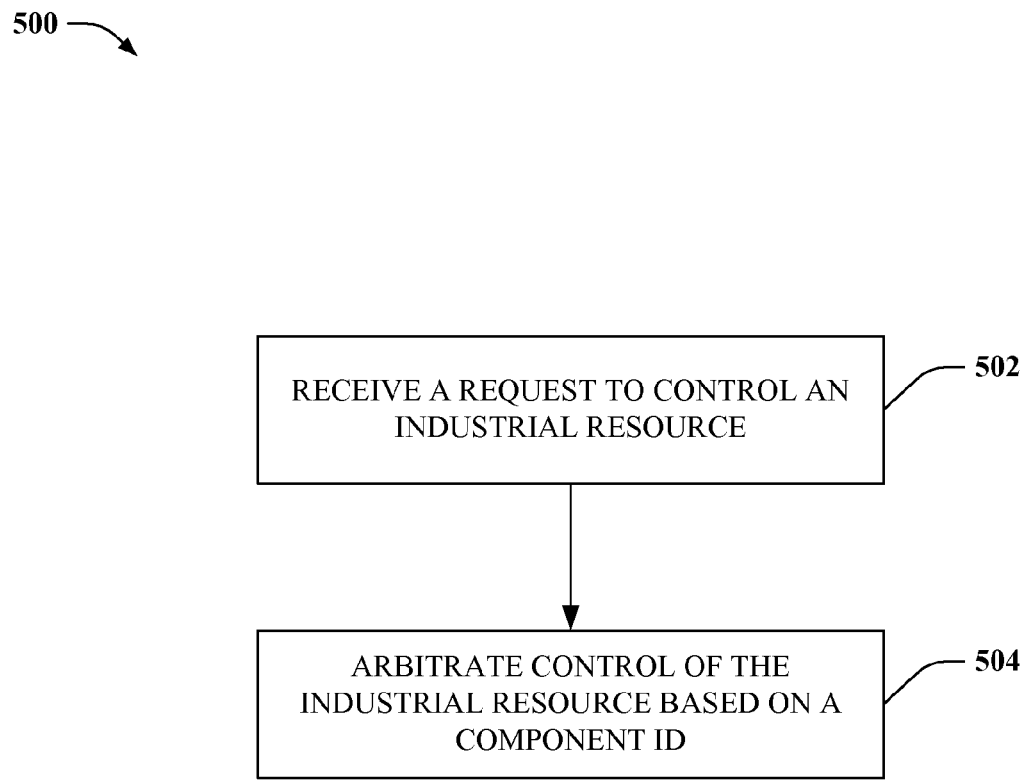
FIG. 5 illustrates an example flowchart of a methodology for arbitrating access to industrial resources in accordance with one or more embodiments.

Referring now to FIG. 5, a flowchart of a sample method 500 for arbitrating access to industrial resources is depicted. At 502, method 500 receives a request to control an industrial resource. The industrial resource can include any suitable component (e.g., communication bus, power source), machine (e.g., motor, pump, conveyor, compressor, lift, mixer, valve, storage container, and so on), module (e.g., control module, equipment module, resource control module), material (e.g., fuel, lubricant, coolant, cleanser), and/or personnel (e.g., technician, department manager) affiliated with an industrial automation process. Control can include direct control, wherein commands are performed by the industrial resource, or a request for information (e.g., database request, reference to a logical program condition, input/feedback from a technician). In addition, such request can be provided by way of any suitable interface, including a communication bus or an HMI.

At 504, method 500 arbitrates control of the industrial resource based on a component ID. The component ID is a unique identifier distinguishing a component from other components (or, e.g., a group of synchronized components). In addition, the component can be any suitable entity capable of communicating with and/or controlling a resource (described above). For instance, the component can be a control module, an equipment module, or a resource control module. Further, the component can be a human (e.g., plant technician) having a component ID (e.g., an ID badge). Arbitration of control can be a decision to provide access to the resource for one component, and deny access for another, based at least on the component ID of one or more components.

For instance, if two control modules request control of a compressor machine within a threshold period of time, the compressor can malfunction due to inconsistent or contrary commands issued by the control modules. Arbitrating control, so that only a single module issues commands to the compressor machine at a time, can help to mitigate such problems. Arbitration can also determine a control priority amongst the two control modules. Specifically, priority can determine which control module can access the resource first. Such priority can be determined based on a first received request, or on importance of a requesting component, or combinations of these and other criteria.

In addition, arbitrating control based on a component ID can circumvent a need for redundant arbitration code in an industrial setting. For instance, conventional arbitration mechanisms typically require one or more arbitration and/or synchronization programs to be coded for each control component. Redundant coding is typically costly and time consuming, as it has to be developed, tested, and debugged. Arbitration based on component ID, on the other hand, can provide a general arbitration mechanism applicable to various industrial control components. Each requesting component can provide an ID along with a request for control, and the ID can be associated with a resource when a component is in control of it. Therefore, competing components can suspend control requests until the ID is cleared. Alternatively, requests can be placed in a queue where the general purpose arbitration algorithm (e.g., a FCFS or HPFS algorithm) can prioritize the requests, and provide access to the resource based on such priority. As described, method 500 can therefore increase efficiency and lower overhead costs associated with an industrial process.

Figure 6:
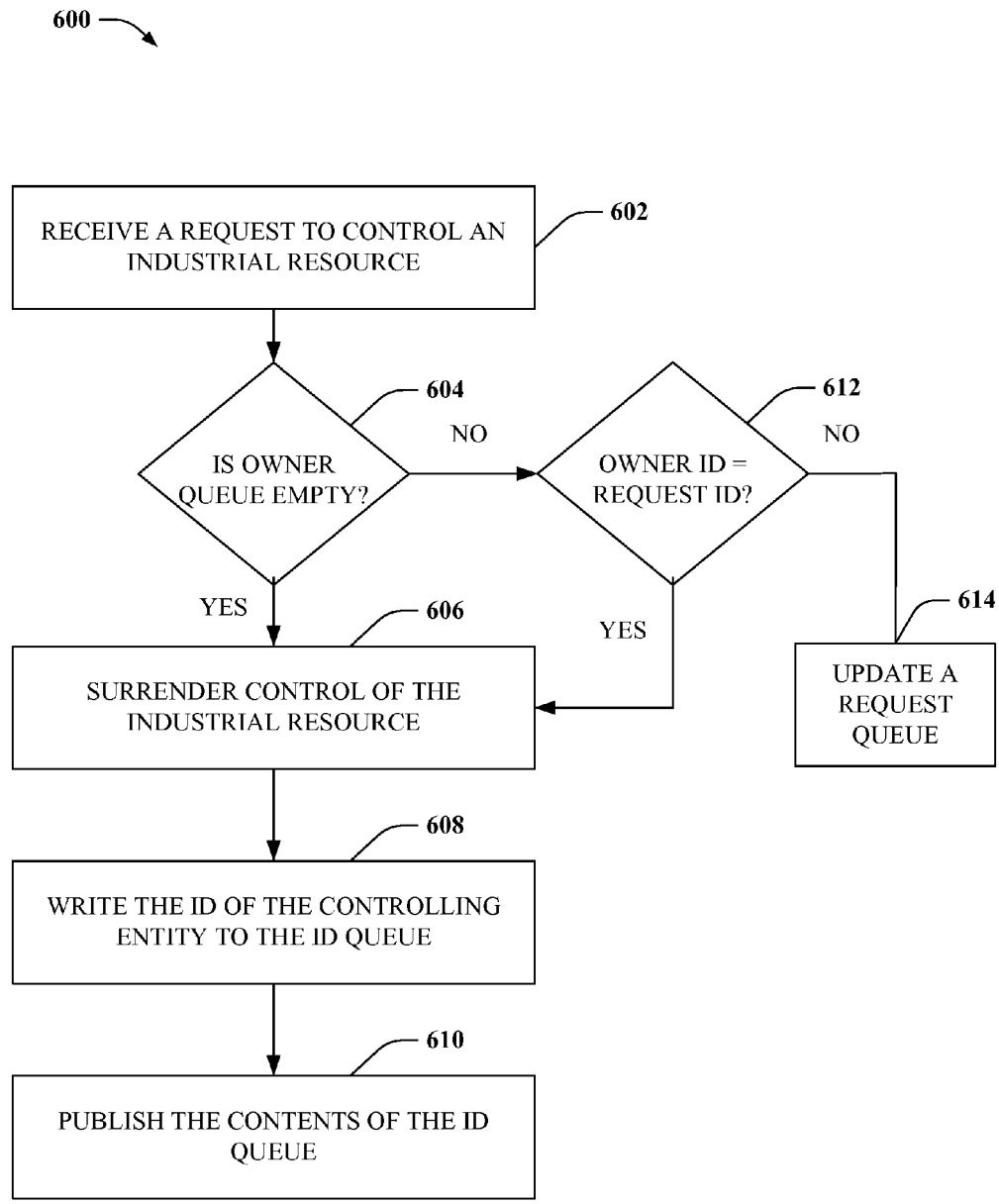
FIG. 6 depicts an example flowchart of a methodology for managing control requests for an industrial resource according to particular embodiments.

Referring to FIG. 6, a flowchart of a sample method 600 is depicted for managing control requests for an industrial resource. Method 600, at 602, receives a request to control an industrial resource, as described herein. At 604, a determination is made as to whether an ownership queue associated with the industrial resource is empty. If the ownership queue is empty, method 600 proceeds to reference number 608, if not method 600 proceeds to reference number 606.

At 606, if the ownership queue is empty, control of the industrial resource is surrendered to a requesting entity. Subsequently, at 608, an ID of the requesting entity is written to the ID queue. As a result, ownership of the resource is established for the requesting entity. At 610, the contents of the ID queue are published. For example, the contents can be included in a file and provided to control components of an industrial network, or access to the ID queue can be provided to pertinent entities for reference. Publication in this manner can therefore apprise networked entities of the ownership of the resource. As a result, subsequent requests for control can be sent directly to a request queue (see below) thereby enhancing system efficiency.

At 612, method 600 makes another determination, if the ownership queue is not empty, as to whether an ID contained therein is the ID of a component requesting control of a resource. If so, method 600 proceeds to 606 where control is surrendered to the requesting component. If not, method 600 proceeds to 614, where a request queue is updated. The request queue can, for instance, store control requests and associated component IDs when the resource is currently owned by a different device (e.g., having a different component ID). In addition, an arbitration algorithm, as described herein, can be utilized to establish a priority for control requests in the request queue. Such priority establishes an order in which multiple requests are given access to an industrial resource when the resource becomes available. As described, method 600 organizes and manages multiple requests to control a resource, thereby promoting efficient and consistent utilization of the resource. In addition, a general purpose arbitration scheme is employed to prioritize the requests, based on an ID associated with a requesting component.

Figure 7:
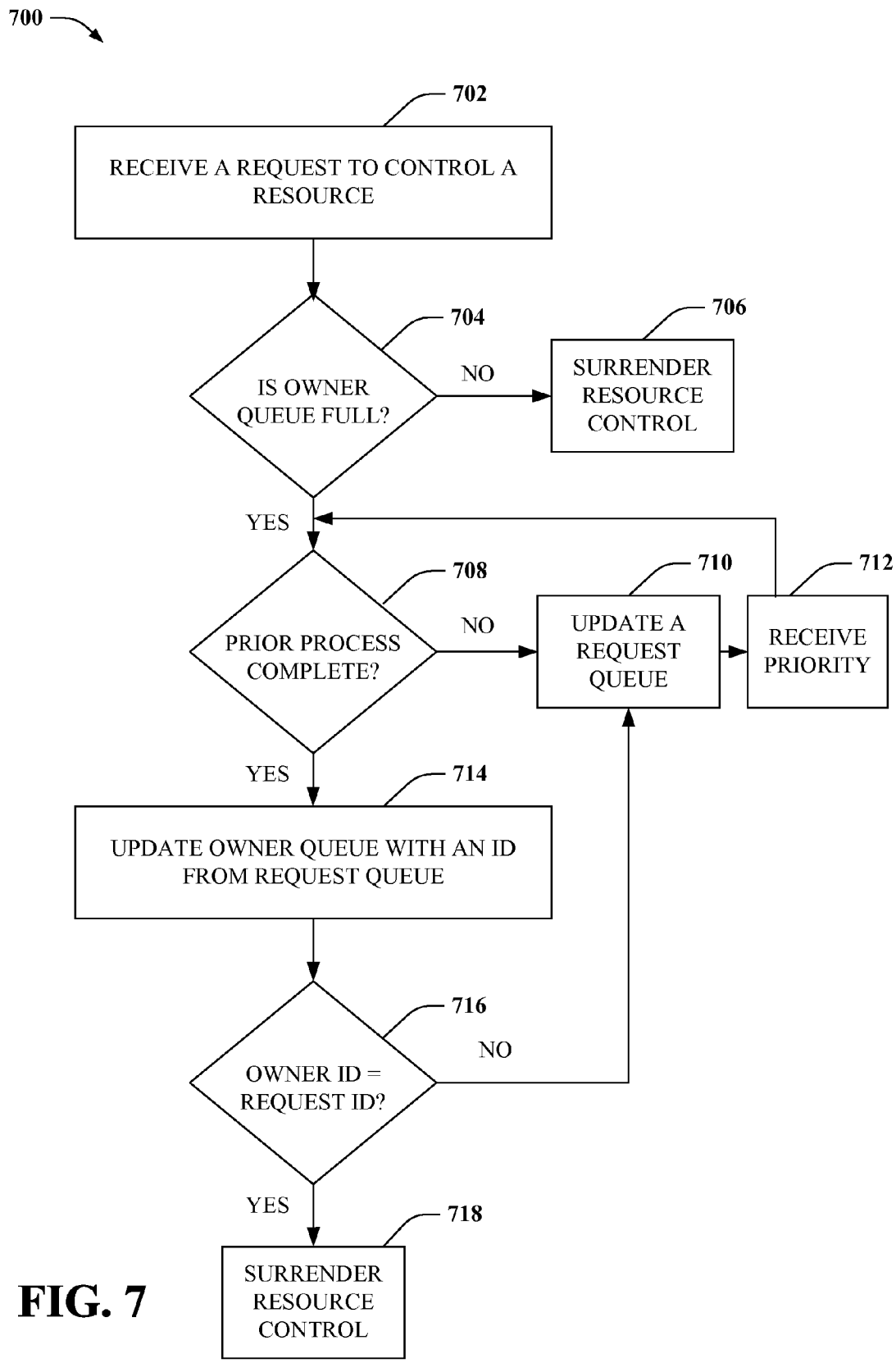
FIG. 7 illustrates an example flowchart of a methodology for updating ownership of a resource and arbitrating control to an owning module.

Referring now to FIG. 7, a flowchart of an example methodology 700 is depicted for updating ownership of a resource and arbitrating control to an owning module. Method 700, at 702, receives a request to control an industrial resource, as described herein. At 704, a determination is made as to whether an ownership queue is full and, if so, whether an owner ID contained therein is the ID of the requesting device. If the ownership queue is not full, or if the owner ID is the ID of the requesting device, method 700 proceeds to 706 where control of the resource is surrendered to the requesting device, for example.

If, at 704, the ownership queue is full (and the owner ID is not the ID of the requesting device), method 700 proceeds to reference number 708. At 708, an additional determination is made as to whether a prior process is complete. For instance, a control module having ownership of a resource can send an ownership termination command when ownership is no longer needed. The ownership termination command can result in clearing the ownership queue, for example. If the ownership queue is cleared, a component ID of another device (if available) is loaded into the ownership queue. Consequently, if the determination at 708 is that a prior process is complete, method 700 proceeds to 714 where the owner queue is updated with a component ID from a request queue.

If, at 708, the prior process is not complete, method 700 proceeds to reference number 710. At 710, a request queue is updated to include the request received at reference number 702. In addition, at 712, the request is provided a priority if such priority is not already specified. For instance, an arbitration algorithm as disclosed in the subject specification, or known in the art, can provide priority based on a component ID associated with the request. Particularly, priority can be based on an order in which the component ID was received relative to other owner IDs, an importance of the owner ID relative to other owner IDs, and so on. Upon generating priority at reference number 712, method 700 again determines whether a prior process is complete at reference number 708.

Upon updating the owner queue with an owner ID from the request queue at 714, method 700 proceeds to 716. At 716, a determination is made as to whether the owner ID updated into the owner queue is equal to the component ID associated with the request received at reference number 702. If so, method 700 proceeds to 718 where control of the resource is surrendered to a requesting entity initiating such request. If the owner ID does not equal the component ID associated with such request, method 700 proceeds to reference number 710, where the request queue is updated again.

Figure 8:
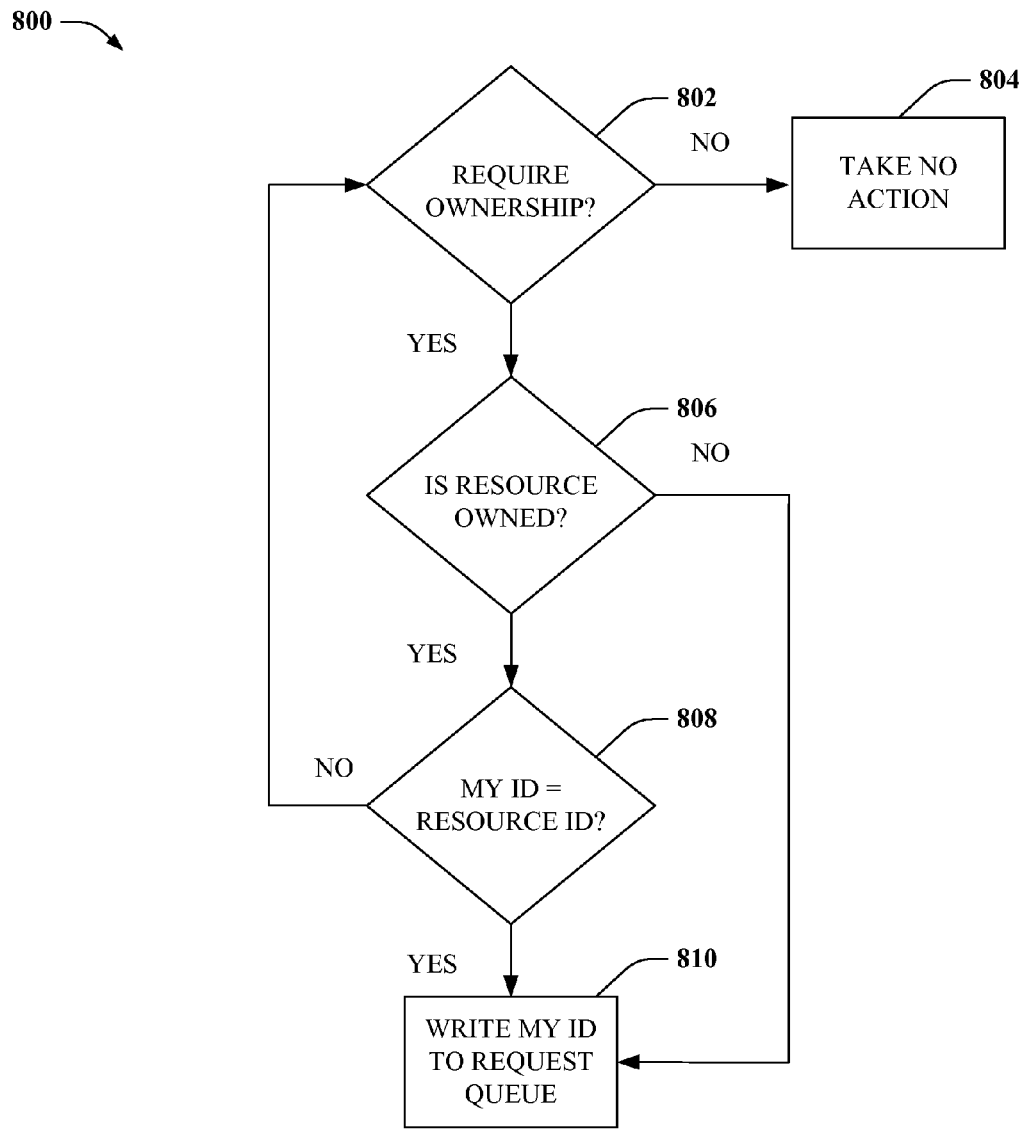
FIG. 8 illustrates an example flowchart of a methodology for generating a request to control an industrial resource in accordance with one or more embodiments.

Referring to FIG. 8, a flowchart of an example methodology 800 is illustrated for securing access to an industrial resource. More specifically, method 800 can be utilized by a control device to initiate a control request for accessing the industrial resource. At 802, a determination is made as to whether ownership of an industrial resource is desired. If not, method 800 proceeds to 804 where no action is taken and where method 800 can terminate. If ownership is desired, method 800 proceeds from reference number 802 to reference number 806. At 806, a determination is made as to whether the industrial resource is currently owned. For instance, an ownership queue can be referenced to determine whether ownership of the resource has been established. If the resource is not owned, method 800 proceeds to reference number 810. If the resource is owned method 800 proceeds to reference number 808.

At 808, another determination is made as to whether an owner ID associated with the resource is equal to an ID of a requesting device. If so, method 800 proceeds to 810. If the owner ID is not equal to the ID of the requesting device, method 800 returns to reference number 802, for instance, to repeat the methodology until the resource is no longer owned or until an owner ID is equal to the ID of the requesting device. At 810, the requesting device writes its ID to an ownership queue of the resource. As a result, control of the resource can pass to the requesting device (e.g., upon initialization of the resource).

Figure 9:
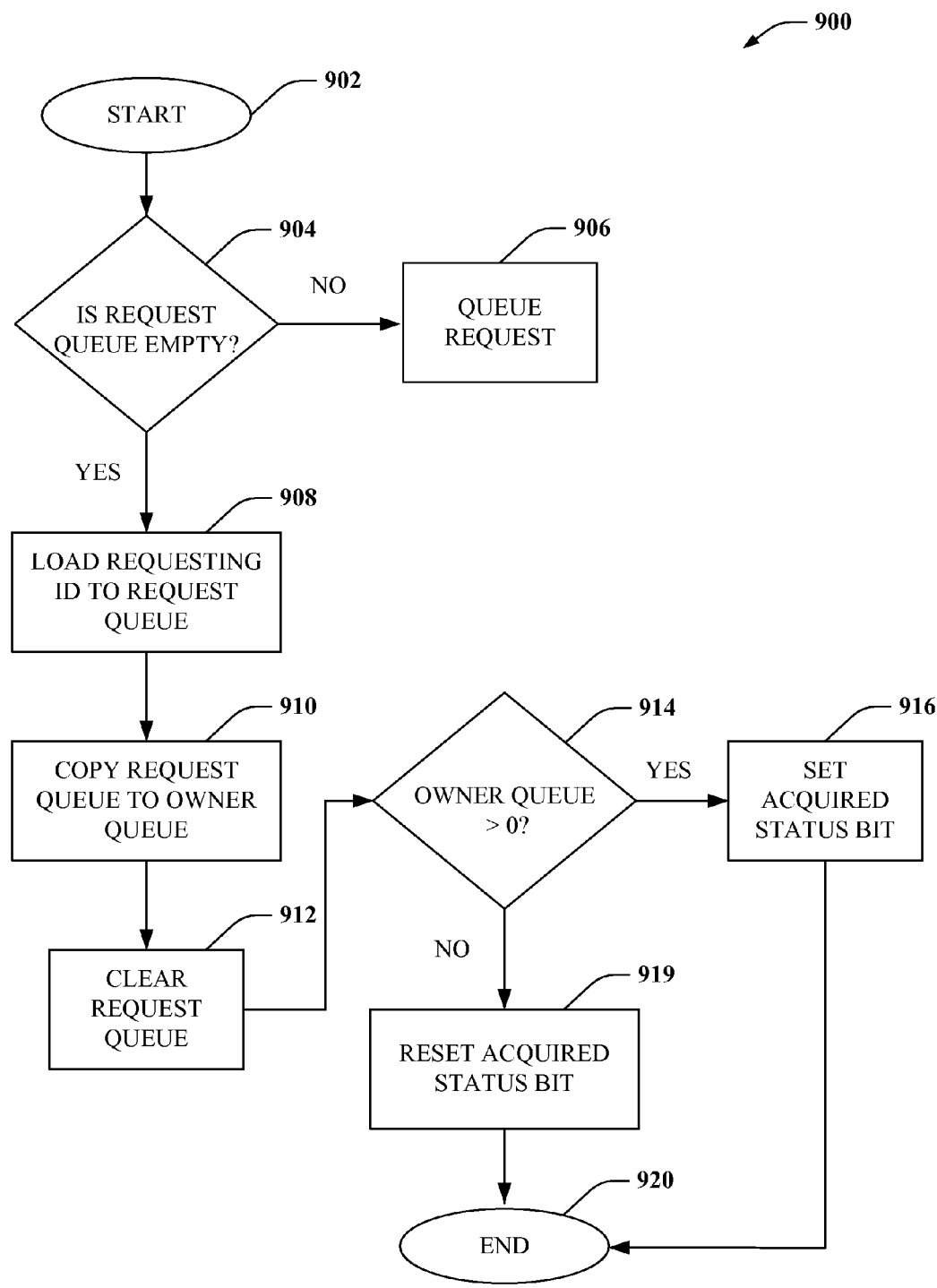
FIG. 9 depicts an example flowchart of a methodology for arbitrating control of an industrial resource according to one or more aspects.

Referring now to FIG. 9, a flowchart of an additional example methodology 900 is illustrated for arbitrating control of an industrial resource. For instance, method 900 can be implemented by an industrial automation system in addition to, or in lieu of, methodologies 500-800. At 902, method 900 begins. At 904, method 900 determines whether a request queue associated with an industrial resource is empty. If the request queue is not empty, an incoming request is placed in queue and prioritized by an arbitration algorithm, as described herein.

If, at reference number 904, the request queue is empty, method 900 proceeds to reference number 908. At 908, a requesting component ID can be loaded into the request queue. At 910, the component ID is then loaded into an owner queue. Upon loading the component ID into the owner queue from the request queue, method 900 also clears the request queue at 912, and proceeds to reference number 914.

At 914, a determination is made as to whether the owner queue is non-empty (e.g., a bit representing the queue is non-zero). If the owner queue is not empty, method 900 proceeds to reference number 916 where a 'resource acquired' bit is set. The resource acquired bit can indicate, for instance, that the resource is concurrently owned by a component of an industrial system. If the owner queue is empty, method 900 proceeds to 918 where the resource acquired bit is reset. Following reference numbers 916 or 918, method 900 proceeds to 920 where the methodology terminates.

It is noted that method 900 can be implemented in conjunction with method 800. For instance, method 900 can provide logic for queuing requests for an arbitrated industrial resource, and method 800 can provide logic for acquiring access of the industrial resource by an industrial controller, for instance. More specifically, writing an ID of a requesting device to a request queue of the industrial resource, at reference number 810 of method 800, can trigger initiation of method 900 at 902. Consequently, methodologies 800 and 900 can be utilized together or separately in order to implement one or more aspects of the subject disclosure.

Figure 10:
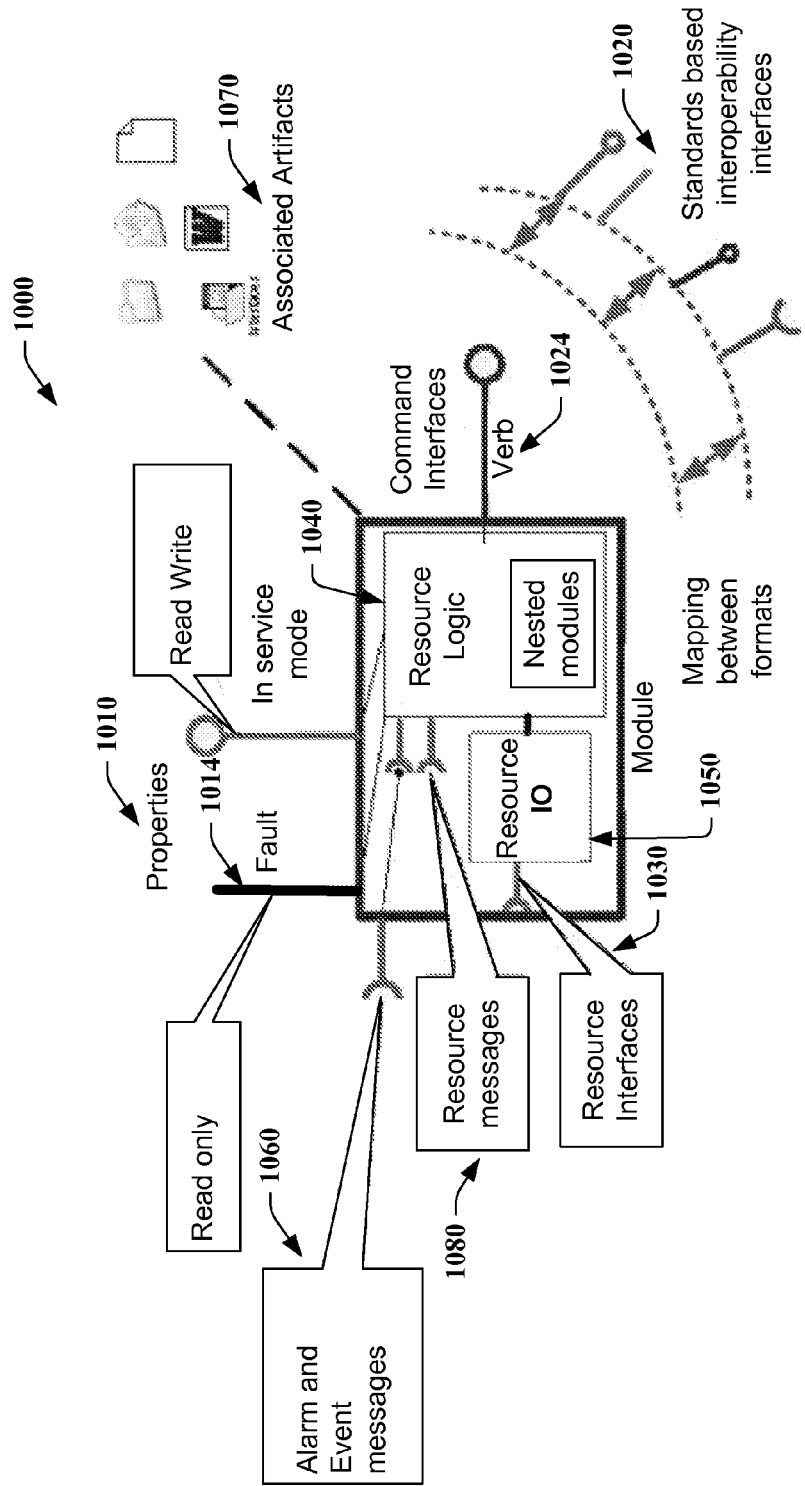
FIG. 10 is a diagram illustrating module attributes.

Referring now to FIG. 10, module attributes 1000 are illustrated. The attributes 1000 depicted in FIG. 10 include a common (or exemplary) representation that can be modules from modules. Generally, a set of standard attributes can be determined that are common to all modules. Similarly, for other types of modules described below, additional standard attributes can be defined. An example of a property 1010 available on modules includes attributes such as Fault and Status at 1014. Active resource modules (e.g., equipment and personnel) can support additional properties 1010 such as available/unavailable.

Attributes presented below are represented associations from the module to objects that may be internal in a common data model or elsewhere (e.g., CAD Files). At 1020, standard public interfaces can be provided. These interfaces 1020 publish verbs 1024 that are available to external systems and are documented activities that hide the complexity of the underlying code used to implement the interface. Interfaces 1020 can be considered into at least two common usage scenarios. For example, interfaces 1020 can be used as access points that can be used to hook in real time diagnostics, security and so forth.

Public verbs 1024 initiate an action within the module. The activity is described to clients of the interface 1020. The implementation is considered private and is not presented to clients—for example, Open, Stop, Abort, Shut, and so forth. A data value property 1010 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 1010 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 1020. e.g., Conversion Map, Name, Description, expiry date, personnel contact information. Some properties 1010 can be common to all instances of resource modules (e.g., scanned copy of resource specification documents), whereas other properties 1010 are specific to each module instance (e.g., Status, percent open).

At 1030, internal resource interfaces include interfaces from logic 1040 in the module to the resource being managed at 1050, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 1030 are internal to the module enabling the module's public interfaces 1020 and properties 1010 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 1020 to runtime systems may then consider these interfaces as internal.

At 1060, alarm and event messages can be provided which include messages exposed as runtime messages that are visible to external systems during the execution of the module. This includes alarms and events explicitly coded by the developer and system messages promoted to be visible by external systems. At 1070, one or more artifacts include information that document the operation and structure of the resource such as for example, wiring diagrams, warranties, payroll, parts supplier information, and so forth. Visualization aspects include associated graphics that present the resource state and properties to applications interacting with the resource. Some examples include: faceplates, icons, edit dialogs, help files, and state overlays. At 1080, system messages allow modules to identify, extract/receive and publish data model messages to external components. Inbound messages are typically used to manage modules (configure, initialize, propagate properties, and so forth) and publish messages on module activity (resource state, data model messages, and so forth).

Figure 11:
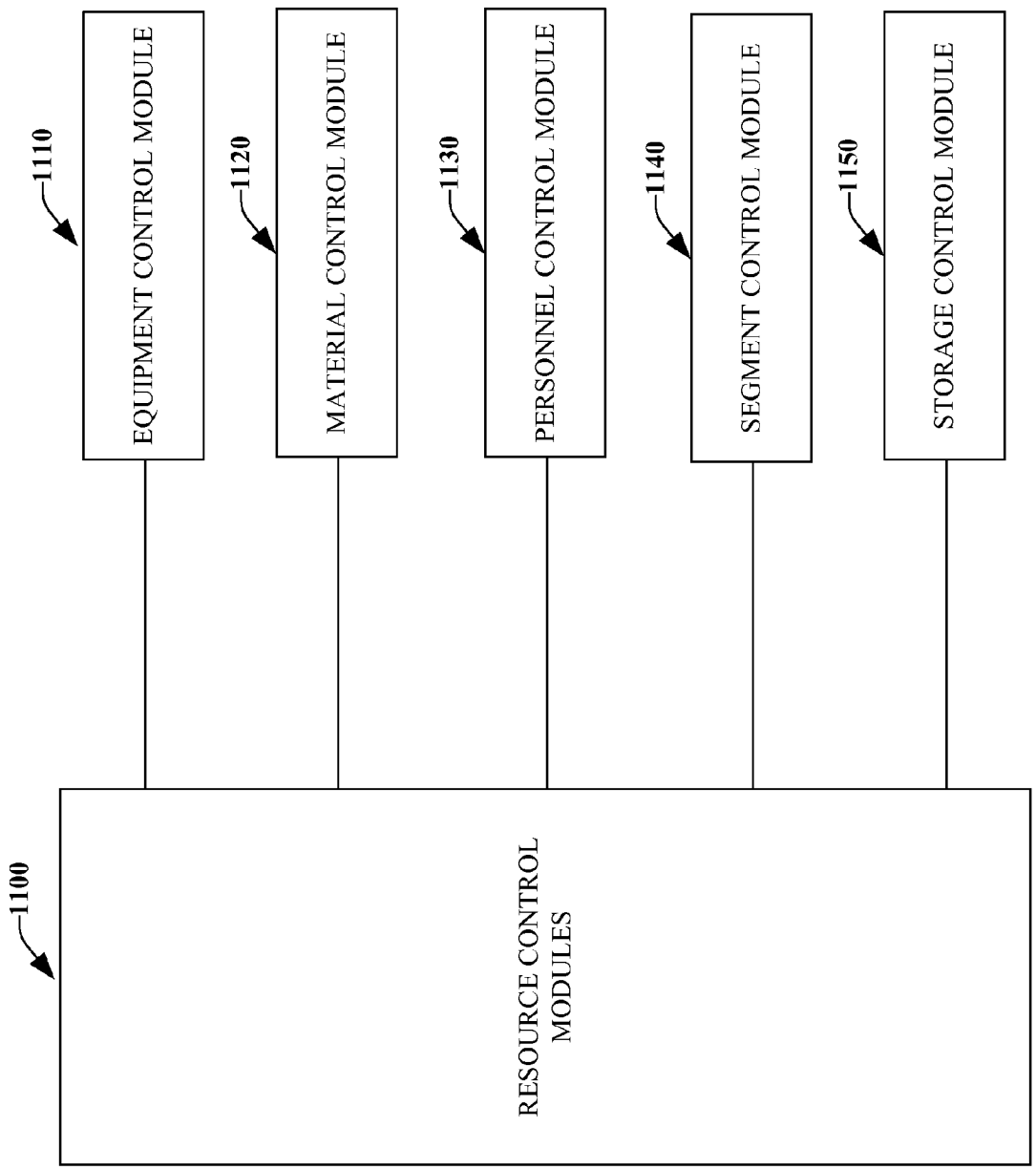
FIG. 11 is a diagram illustrating example resource control modules.

Turning to FIG. 11, example resource control modules 1100 are illustrated. In general, resource control modules 1100 provide simple control of one or more resources. The resource control module (RCM) 1100 represents the logic to manage the state or data of the resource and may contain other resource control modules to achieve its respective functionality. The RCM 1100 provides public interfaces via actions and properties. In some cases, an action may be a simple bit value or a request value that is interfaced to internal values in the module and in other cases more complex logic can be provided. The RCM 1100 can include other resource control modules and may promote a command to be represented as a segment resource control interface. At 1110, an Equipment Control Module (Common name="Control Module") CM is depicted. The CM can be the simplest form of basic regulatory control of equipment for an industrial environment. Further, the CM can encapsulate the equipment and its control such as control of values, drives, and so forth. At 1120, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 1130, a Personnel Control Module (PCM) is provided. This includes management of individual people such as Active, Idle, Break states directly or via shift schedules. This also includes data associated with people such as shift time patterns, for example. Other attributes that may be managed by PCM 1130 are a person's location in a plant (e.g., by way of GPS), qualification checks, or current assignment, for example. At 1140, a Segment Control Module (SCM) includes manipulation of simple segment tasks such as piping paths, AGV paths, device state machines, robotic sequences and so forth. The SCM 1140 typically performs an action on one segment such as next step to execute after the current step. At 1150, a Storage Control Module (STGCM) includes Manipulation of simple storage logic such as buffer capacity and ordering into and out of a queue for the respective storage unit or requirement.

Figure 12:
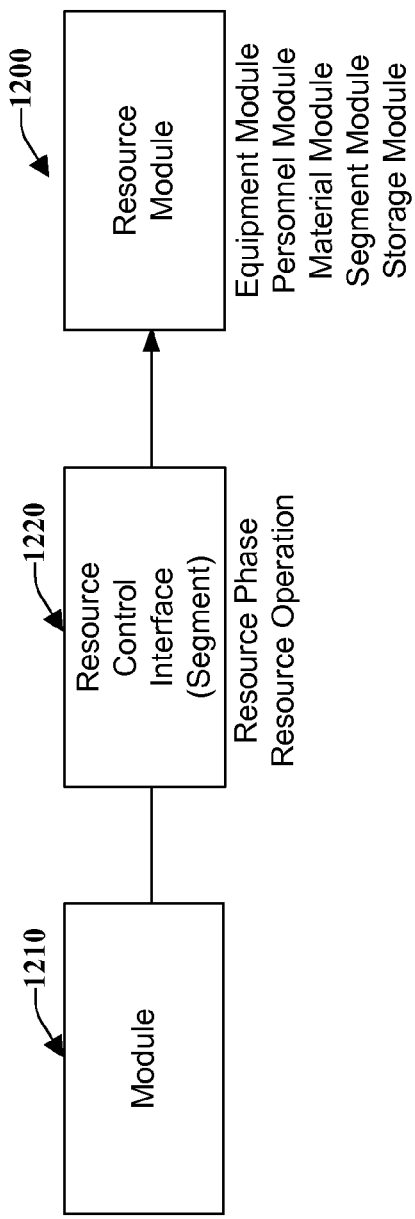
FIG. 12 is a diagram illustrating a resource module.

FIG. 12 illustrates a resource module 1200 for an industrial control system. Resource modules 1200 extend resource control modules described above to enable coordination of resources (equipment, people, modules and so forth) and achieve synchronized application of such resources. As shown, the resource control module 1200 includes a module 1210 and a resource control interface 1220. Resource modules 1200 are also able to represent more complex activities than resource control modules. For example, resource modules may include other resource control modules at 1210 and/or other resource modules. For example, an equipment module may leverage a subordinate material control module to represent material handling aspects or a segment module to solicit an electronic signature.

Before proceeding it is noted that other types of modules are possible than shown. For instance, a configuration module may include management definitions and configuration of resources—personnel, segments, equipment, segments, storage, and so forth. Another type of module includes nested modules where a module references other modules. These modules may be children of a parent module or shared from one module to another. Resource modules may include resource control modules; however resource control modules should not include resource modules. Modules can include modules focused on other resource types, for example an equipment module may include equipment modules and material modules.

It is also noted that while a resource module 1200 can be a resource of an industrial system, controlled and applied for a particular purpose as described herein, not all resource modules 1200 need be available as an industrial resource. For instance, the material control module subordinated by the equipment module described above can be an example of a module used as a resource. As an additional example, a configuration module can be autonomous and inaccessible for control by other modules; such a module may be available only as a reference source, for instance. Similar variations to these examples can be extrapolated and extended to other example modules described herein or known in the art.

Figure 13:
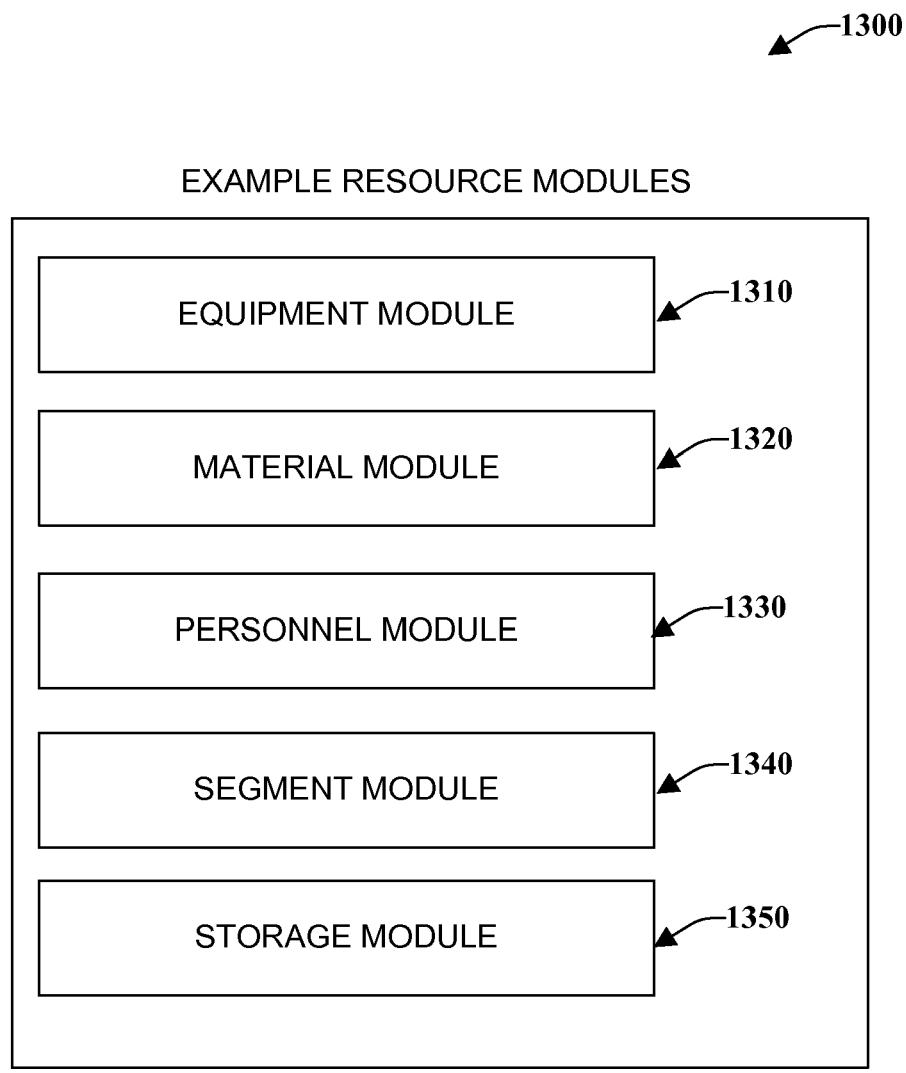
FIG. 13 is a diagram illustrating example resource modules.

FIG. 13 illustrates example resource modules 1300 for an industrial control system. At 1310, an Equipment Module provides coordination of equipment modules and equipment control modules to perform a process-orientated task independent of specific material e.g., In-feed, AGV controller, Conveyor, and so forth. At 1320, a Material Module provides coordination of material modules and material control modules to perform material focused tasks e.g., Material reservation, provision, material mass balance calculation, Bill of Material management, Work order management, and so forth. At 1330, a Personnel Module provides coordination of personnel modules and personnel control modules to perform personnel focused tasks e.g., Electronic signature collection, Security validation, certification validation, Manual control interactions, and so forth.

At 1340, a Segment Module provides coordination of segment modules and segment control modules and to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 1340 may also construct a sequence to be followed that can be applied as manual, automatic or semi automatic sequences (e.g., Route, recipe execution). At 1350, a Storage Module provides coordination of storage related activities, allocation of storage to requestors, modeling of inventory calculations and so forth. This also includes interaction with higher-level systems that manage storage and inventory information.

Figure 14:
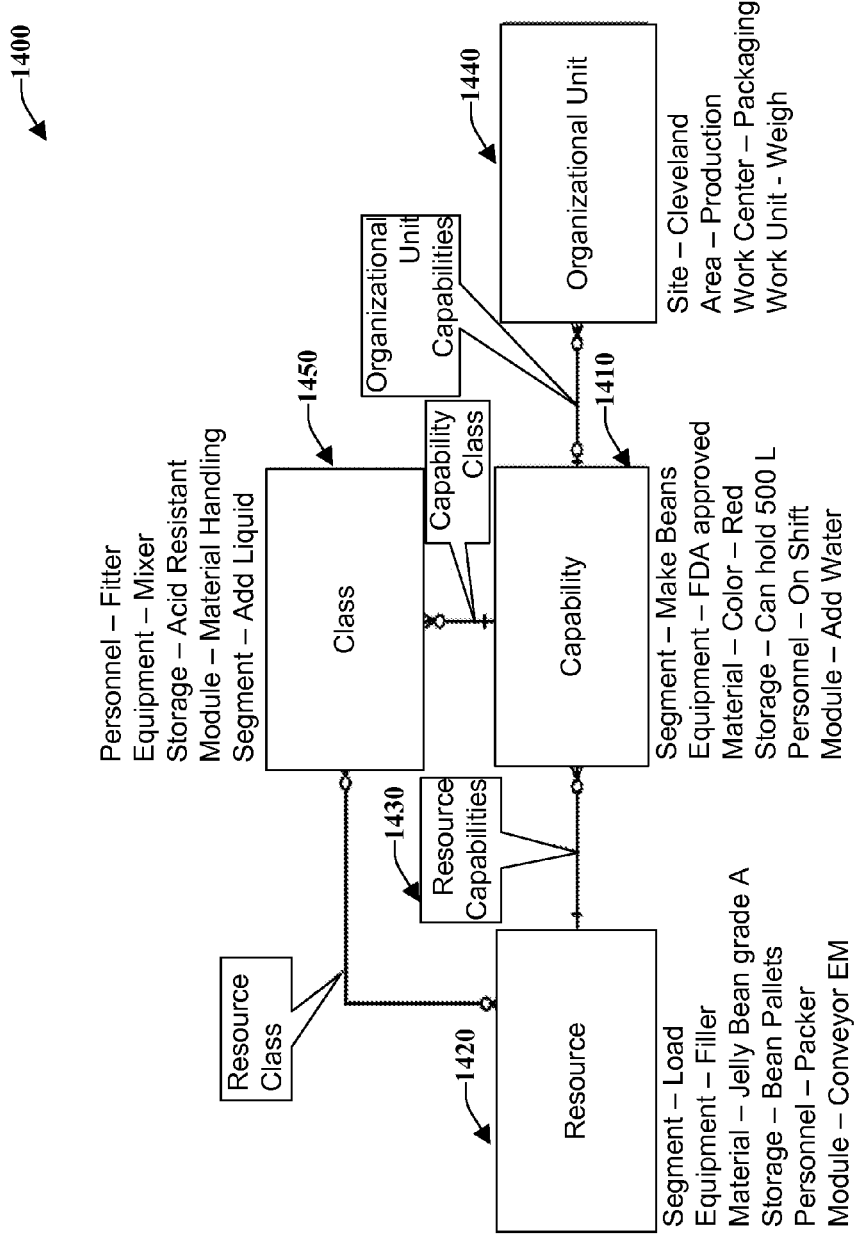
FIG. 14 is a diagram illustrating a resource control model.

FIG. 14 illustrates an example resource control model 1400 for an industrial control system. Resource Control Interfaces are the interfaces exposed to production management systems for resource binding and arbitration purposes. The interfaces are elements of the resource control model 1400 including procedures, operations or phases. These interfaces are made available by exposure via one or more capabilities 1410 described below. Procedures, operations and phases depicted in this model 1400 are commonly referred to in association with their module resource type such as Equipment Phase, Personnel Phase, Segment Phase, or as a generic Resource Phase where no specific resource module is desired. Production management including Product Production Rules (production route or control recipe) physically bind to (reference) resource control phases to perform work. The availability of other resources 1420 such as material, equipment, personnel are considered during the binding process of product production rules to work centers (production lines, process cells, and so forth). These selection processes evaluate resource capabilities to locate the appropriate resource for the task.

Resource capabilities 1410 include the resource 1420 required to perform work in a production system. Consequently, resources 1420 are at the centre of efficiency, capacity, scheduling and arbitration considerations. A resource's ability to work or be available to allow work to commence is represented as resource capability at 1430. The existence of capability 1430 associated with a resource 1420 does not make the resource available for production; the resource's capability 1430 is associated with organizational units 1440 that can support the respective resource capability. For example, an operator (personnel resource) may have qualifications for a Mixer in line 1, where this qualification capability is only in effect with that specific mixer unless explicitly directed. Resource arbitration algorithms (e.g., first request, priority first, as described herein and like algorithms) can search for resource capabilities 1430 in the scope of organizational units 1440 they are to be executed within.

Resources 1420 publish capabilities to organizational units 1440 for use by system processes in a given scope. Modules are a type of resource and can be accessed directly by published capabilities 1410. However, a more common interface to Resource Modules is via verbs that are supported by the Resource Module noted above. These verbs are Resource Control elements (phases, operations, procedures . . . ) which are segments. A published capability of a resource module is typically one of the phases supported by the module. Resource control interfaces are published (made available) to the outside world as capabilities 1410. Resource modules provide the ability to promote a command to become a resource control interface.

Some process control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities that can be accessed as "tuning knobs" for tweaking the system between system states. As shown in the model 1400, the resource 1420 and capability can be associated with a higher-level class or abstraction 1450.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates module arbitration in an industrial environment, comprising:
a processor;
a memory communicatively coupled to processor, the memory having stored therein computer-executable instructions, comprising:
a module configured to control a resource of an industrial process, wherein the module has an associated safety component identifier and the resource has an associated safety integrity level threshold;
an ownership component associated with the resource configured to facilitate arbitration of control of the resource between the module and at least one other module configured to control the resource;
a control monitoring component configured to publish contents of an ownership queue associated with the resource, wherein the contents are published to one or more industrial control networks associated with the module or the at least one other module; and
wherein the ownership component is further configured to grant control of the resource to the module in response to a sum of the safety component identifier associated with the module and other safety component identifiers in the ownership queue not meeting the safety integrity level threshold.

2. The system of claim 1, wherein
the resource is a safety resource associated with a safety requirement of the industrial process, the safety resource comprises at least one of a presence sensing device, a safety switch, an interlock switch, a safety relay, an emergency stop device, a cable pull and enabling switch, or a safety controller.

3. The system of claim 2, wherein the module is a safety integrity level component or a performance level component.

4. The system of claim 2, wherein the resource is a safety integrity level component or a performance level component.

5. The system of claim 1, wherein the ownership component is further configured to provide control of the resource to the module based upon a position of a unique identifier of the module in a request queue associated with the resource.

6. The system of claim 5, wherein the ownership component is further configured to write the unique identifier into the ownership queue in response to granting control of the resource to the module.

7. The system of claim 1, wherein the ownership component is configured to write the safety component identifier of the module in a request queue associated with the resource in response to the sum not meeting the safety integrity level threshold.

8. The system of claim 1, wherein:
the resource further comprises an associated performance level threshold; and
the ownership component is configured to grant control of the resource to the module in response to the sum of the safety component identifier associated with the module and other safety component identifiers in the ownership queue meeting the performance level threshold.

9. The system of claim 8, wherein the ownership component is configured to write the safety component identifier of the module in a request queue associated with the resource in response to the sum not meeting the performance level threshold.

10. The system of claim 1, wherein the resource is configured for concurrent ownership by a plurality of modules identified in the ownership queue.

11. A method for providing module arbitration in an industrial process, comprising:
employing at least one processor executing computer executable instructions embodied on at least one non-transitory computer readable medium to perform operations comprising:
receiving a request to control a resource of an industrial process from an module, wherein the module has an associated safety component identifier and the resource has an associated safety integrity level threshold;
arbitrating control of the resource between the module and at least one other module;
publishing contents of an ownership queue associated with the resource, wherein the contents are published to one or more industrial control networks associated with the module or the at least one other module; and
granting control of the resource to the module in response to a the sum of the safety component identifier associated with the module and other safety component identifiers in the ownership queue meeting the safety integrity level threshold.

12. The method of claim 11, wherein the resource is a safety resource associated with a safety requirement of the industrial process, the safety resource comprises at least one of a presence sensing device, a safety switch, an interlock switch, a safety relay, an emergency stop device, a cable pull and enabling switch, or a safety controller.

13. The method of claim 11, further comprising providing control of the resource to the module based upon a position of a unique identifier of the module in a request queue associated with the resource.

14. The method of claim 13, further comprising writing the unique identifier into the ownership queue in response to granting control of the resource to the module.

15. The method of claim 11, further comprising writing the safety component identifier of the module in a request queue associated with the resource in response to the sum not meeting the safety integrity level threshold.

16. The method of claim 11, further comprising:
wherein the resource further comprises an associated performance level threshold; and
granting control of the resource to the module in response to the sum of the safety component identifier associated with the module and other safety component identifiers in the ownership queue meeting the performance level threshold.

17. The method of claim 16, further comprising writing the safety component identifier of the module in a request queue associated with the resource in response to the sum not meeting the performance level threshold.

18. The method of claim 17, wherein the resource is configured for concurrent ownership by a plurality of modules identified in the ownership queue.

19. The method of claim 11, wherein the module is a safety integrity level component or a performance level component.

20. The method of claim 19, wherein the resource is a safety integrity level component or a performance level component.

21. A non-transitory computer-readable medium having instructions stored thereon that, in response to execution, cause at least one device to perform operations comprising:
receiving a request to control a resource of an industrial process from an module, wherein the module has an associated safety component identifier and the resource has an associated safety integrity level threshold;

arbitrating control of the resource between the module and at least one other module;

publishing contents of an ownership queue associated with the resource, wherein the contents are published to one or more industrial control networks associated with the module or the at least one other module; and granting control of the resource to the module in response to a the sum of the safety component identifier associated with the module and other safety component identifiers in the ownership queue meeting the safety integrity level threshold.

22. The non-transitory computer-readable medium of claim 21, wherein the resource is a safety resource associated with a safety requirement of the industrial process, the safety resource comprises at least one of a presence sensing device, a safety switch, an interlock switch, a safety relay, an emergency stop device, a cable pull and enabling switch, or a safety controller.

23. The non-transitory computer-readable medium of claim 21, the operations further comprise providing control of the resource to the module based upon a position of a unique identifier of the module in a request queue associated with the resource.

24. The non-transitory computer-readable medium of claim 21, the operations further comprise writing the safety component identifier of the module in a request queue associated with the resource in response to the sum not meeting the safety integrity level threshold.

25. The non-transitory computer-readable medium of claim 21, wherein:
the resource further comprising an associated performance level threshold; and
the operations further comprise granting control of the resource to the module in response to the sum of the safety component identifier associated with the module and other safety component identifiers in the ownership queue meeting the performance level threshold.

26. The non-transitory computer-readable medium of claim 21, the operations further comprise writing the safety component identifier of the module in a request queue associated with the resource in response to the sum not meeting the performance level threshold.

27. A system that facilitates module arbitration in an industrial environment, comprising:
a processor;
a memory communicatively coupled to processor, the memory having stored therein computer-executable instructions, comprising:
a module configured to control a resource of an industrial process, wherein the module has an associated safety component identifier and the resource has an associated performance level threshold;
an ownership component associated with the resource configured to facilitate arbitration of control of the resource between the module and at least one other module configured to control the resource;
a control monitoring component configured to publish contents of an ownership queue associated with the resource, wherein the contents are published to one or more industrial control networks associated with the module or the at least one other module; and wherein
the ownership component is further configured to grant control of the resource to the module in response to a sum of the safety component identifier associated with the module and other safety component identifiers in the ownership queue not meeting the performance level threshold.

28. A method for providing module arbitration in an industrial process, comprising:
employing at least one processor executing computer executable instructions embodied on at least one non-transitory computer readable medium to perform operations comprising:
receiving a request to control a resource of an industrial process from an module, wherein the module has an associated safety component identifier and the resource has an associated performance level threshold;
arbitrating control of the resource between the module and at least one other module;
publishing contents of an ownership queue associated with the resource, wherein the contents are published to one or more industrial control networks associated with the module or the at least one other module; and
granting control of the resource to the module in response to a the sum of the safety component identifier associated with the module and other safety component identifiers in the ownership queue meeting the performance level threshold.

29. A non-transitory computer-readable medium having instructions stored thereon that, in response to execution, cause at least one device to perform operations comprising:
receiving a request to control a resource of an industrial process from an module, wherein the module has an associated safety component identifier and the resource has an associated performance level threshold;
arbitrating control of the resource between the module and at least one other module;
publishing contents of an ownership queue associated with the resource, wherein the contents are published to one or more industrial control networks associated with the module or the at least one other module; and
granting control of the resource to the module in response to a the sum of the safety component identifier associated with the module and other safety component identifiers in the ownership queue meeting the performance level threshold.

* * * * *